United States Patent [19]

Avinash

[11] Patent Number: 5,561,611
[45] Date of Patent: Oct. 1, 1996

[54] METHOD AND APPARATUS FOR SIGNAL RESTORATION WITHOUT KNOWLEDGE OF THE IMPULSE RESPONSE FUNCTION OF THE SIGNAL ACQUISITION SYSTEM

[75] Inventor: Gopal B. Avinash, Middleton, Wis.

[73] Assignee: Noran Instruments, Inc., Madison, Wis.

[21] Appl. No.: 317,888

[22] Filed: Oct. 4, 1994

[51] Int. Cl.$^6$ ........................................ G06G 7/32
[52] U.S. Cl. .................. 364/553; 364/576; 364/574; 382/279; 382/280
[58] Field of Search .................. 364/553, 576, 364/574, 413.19, 413.2, 413.21; 382/128, 275, 279, 280; 348/79

[56] References Cited

U.S. PATENT DOCUMENTS

| | | | |
|---|---|---|---|
| 4,863,226 | 9/1989 | Houpt et al. | 359/212 |
| 5,047,968 | 9/1991 | Carrington et al. | 364/574 |
| 5,241,471 | 8/1993 | Trousset et al. | 364/413.19 |
| 5,375,156 | 12/1994 | Kuo-Petravic et al. | 364/413.21 |
| 5,414,623 | 5/1995 | Lu et al. | 364/413.19 |

OTHER PUBLICATIONS

B. L. K. Davey, et al., "Blind Deconvolution of Noisy Complex-Valved Image," Optics Communications, vol. 69, No. 5–6, 15 Jan. 1989, pp. 353–356.

D. A. Agard, et al., "Fluorescense Microscopy in Three Dimensions," in *Methods in Cell Biology*, Academic Press, Inc., vol. 30, 1989, pp. 353–377.

B. C. McCallum, "Blind Deconvolution by Simulated Annealing," Optics Communications, vol. 75, No. 2, 15 Feb. 1990, pp. 101–105.

Ayers, et al. "Iterative Blind Deconvolution Methods and its Applications," Optics Letters, vol. 13, No. 7, Jul. 1988, pp. 547–549.

Krishnamurthi, et al. "Blind Deconvolution of 2D and 3D Fluorescent Micrographs," SPIE, vol. 1660, Biomedical Image Processing and Three-Dimensional Microscopy, 1992, pp. 95–102.

Sezan, et al. "Survey of Recent Developments in Digital Image Restoration," Optical Engineering, vol. 29, No. 5, May 1990, pp. 393–404.

Lajendijk, et al. "Maximum Likelihood Image and Blur Identification: A Unifying Approach," Optical Engineering, vol. 29, No. 5, May 1990, pp. 422–435.

Lay, et al. "Image Identification and Restoration Based on the Expectation–Maximization Algorithm," Optical Engineering, vol. 29, No. 5, May 1990, pp. 422–435.

(List continued on next page.)

Primary Examiner—Ellis B. Ramirez
Assistant Examiner—Hal D. Wachsman
Attorney, Agent, or Firm—Foley & Lardner

[57] ABSTRACT

A noisy signal obtained from an acquisition system, such as a conventional or confocal microscope, is reconstructed in a manner which simultaneously estimates the true or ideal signal as well as the response function of the acquisition system. The restored signal can be a function of one or more variables, e.g., time or space. Prior knowledge of the response function of the acquisition system is not required, there is no need to calibrate the acquisition system before acquiring a signal. The true signal and the response function of the acquisition system are estimated in iterative manner. The actual signal data and the frequency content of the actual signal data may be used to determine constraints to be applied to the estimates of the true signal and the impulse response of the acquisition system. These constraints include constraints on the signal (in the spatial domain) and constraints in the frequency domain. In each iteration, an updated estimate of the ideal signal is used to update an estimate in the frequency domain of the response function, and then the updated response function is used to provide an updated estimate of the signal in the frequency domain. The spatial and frequency domain constraints are applied at each iteration. Iterations continue until a selected criterion is reached, such as a selected number of iterations.

47 Claims, 13 Drawing Sheets

OTHER PUBLICATIONS

Holmes, Timothy J. "Blind Deconvolution of Quantum–Limited Incoherent Imagery: maximum Likelihood Approach," J. Opt. Soc. Am. A, vol. 9, No. 7, Jul. 1992, pp. 1052–1061.

Avinash, Gopal *Computational Optical Sectioning Microscopy Using Convex Projection Theory With Applications,* Ph.D. Thesis, University of Michigan, 1992.

Holmes, et al. "Three–Dimensional Image Reconstruction of Fluorescene Micrographs Without Knowing the Point Spread Function," Proceedings at 51st Annual Meeting of the Microscopy Society of America, 1993, pp. 152–153.

Holmes, et al. "Deconvolution of 3D Widefield and Confocal Fluorescence Microscopy Without Knowing the Point Spread Function," Proceedings of Scanning 1993, pp. III–57 to III–59.

Avinash, et al. "Three–Dimensional Analysis of Contrast–Filled Microvessel Diameters," Microvascular Research vol. 45, 1993, pp. 180–192.

METHOD AND APPARATUS FOR SIGNAL RESTORATION WITHOUT KNOWLEDGE OF THE IMPULSE RESPONSE FUNCTION OF THE SIGNAL ACQUISITION SYSTEM

FIELD OF THE INVENTION

This invention relates generally to the field of signal processing and particularly to the improvement of signal resolution, and the resolution of images represented by such signals, by compensating for distortions caused by the signal acquisition system.

BACKGROUND OF THE INVENTION

In the processing of various types of signals and images, including one dimensional signals (e.g., a function only of time) or multidimensional signals (e.g., an image signal which is a function of two or three dimensional space), it is often desirable to improve the quality of the signal from the signal acquisition system to correct for distortions introduced by the acquisition system. Such processing must be carried out in the inevitable presence of noise. Assuming a linear acquisition system, the output signal g from an acquisition system having an impulse response function h, responding to an actual signal f, and contaminated by random noise n, can be expressed as:

$$g = h \otimes f + n$$

where $\otimes$ represents the convolution operation.

For many types of signal acquisition systems of great practical importance, the impulse response h is bandlimited in the frequency domain and varies over different portions of the signal, and cannot be calibrated accurately by empirical methods. Such acquisition systems include, by way of example, various types of microscopes, including widefield and confocal microscopes, scanning electron microscopes, scanning transmission electron microscopes, many other types of spectroscopic instruments including X-ray, infrared, etc., and one and two-dimensional gel electrophoresis processes.

One area of particular interest is fluorescence microscopy, which permits the imaging of very weak light signals from luminescent molecules. In fluorescence microscopy, the detection optics of the microscope system is modified so that only certain wavelengths of light from excited molecules reach the detector, and the use of such microscopy with various fluorescent probes makes the technique very useful for imaging cells or parts of cells, indicating concentration of ions, in the staining of specific organelles, in detecting and quantifying membrane potentials, and in the detection of target molecules both inside and outside of the cell.

In conventional fluorescence microscopy, the fluorescent intensity at a given point in a stained region can provide quantitative information about the target molecules. However, it is well known that in any microscope when a point object is imaged in three dimensions, the point is imaged not only in the plane of focus but also in the planes around the focal plane. Furthermore, the intensity of the point falls off more slowly in the direction of the optical axis as compared to a direction perpendicular to the optical axis. Therefore, in a 3-D specimen being imaged, the intensity measured at any point in a given plane will be influenced by contributions of the intensities of neighboring points, and the Contributions of points from out-of-focus planes have a greater effect on the quality of the image than contributions from in-focus points. In the spatial frequency domain, these distortions are manifested in two different ways. First, outside of a biconic region of frequencies in the three dimensional spatial frequency spectrum, the spectrum of the image is degraded by a strong low-pass function, and secondly, inside the biconic region of frequencies, all the frequency components of the image are removed during the image formation process. The severity of these distortions depends on the numerical aperture of the objective lens used for obtaining 3-D images. Higher numerical aperture lenses yield better 3-D images than lower numerical aperture lenses because of their superior optical sectioning capability. However, in addition to such optics-dependent distortions, image data is invariably corrupted by imaging noise. Thus, it is a significant problem to obtain good qualitative and quantitative information about the actual specimen from degraded images because if out of focus information is not excluded, unpredictable errors can affect both the visual and quantitative analysis of the specimen.

A relatively recent development in microscopy is the confocal scanning microscope, in which only a single diffraction-limited spot in the specimen is illuminated at a time, with the light emitted from the illuminated spot being focused through an aperture which is "confocal" with the spot of illumination. An image of a three-dimensional specimen is acquired by scanning a frame in the in-focus image plane and then moving the image plane to acquire additional frames of data until the entire specimen is scanned. In theory, in a confocal microscope the out-of-focus information can be removed, but in practice reducing the size of the confocal aperture results in a corresponding reduction in the signal-to-noise ratio.

Thus, in both conventional and confocal microscopy, as well as in other signal processing systems, it is desirable to extract information from the original signal which would otherwise yield, when the signal is displayed as an image, a blurred, noisy image. The process of extracting unblurred images is called deconvolution. Typical prior deconvolution processes require knowledge of the blurring function (impulse response) of the signal acquisition system (e.g., a conventional microscope or a confocal microscope) called the point spread function (PSF) o A technique utilizing projection onto convex sets and a form of Landweber iteration has been used for image restoration where the exact PSF is available through empirical measurements, e.g., by measuring the PSF of a microscope which involved imaging a diffraction limited point source. See Gopal B. Avinash, *Computational Optical Sectioning Microscopy with Convex Projection Theory with Applications*, Ph.D. thesis, 1992, University of Michigan, University Microfilms International, Inc., and Gopal B. Avinash, Wayne S Quirk, and Alfred L Nuttal,"Three-Dimensional Analysis of Contrast Filled Microvessel Diameters," Microvascular Research, Vol 45, 1993, pp 180–192.

In most practical situations a complete knowledge of the PSF is not available, or the calibration procedures have to be carried out before each new specimen is imaged, which is often so time consuming as to make the procedure impractical. Thus, attempts have been made to develop procedures called blind deconvolution which do not require complete prior knowledge of the PSF, and which attempt to simultaneously identify both the blurring function (the PSF) and the ideal unblurred image using the observed image data which are blurred and noisy.

A special type of image formation occurs in microscopy where the image of a specimen is degraded by a bandlimited PSF In the paper by T. J. Holmes, "Blind Deconvolution of Quantum Limited Incoherent Imagery: Maximum Likelihood Approach," J. Opt Soc. Am. A, Vol 9, 1992, pp. 1052, et seq., a method based on maximum likelihood estimation for blind deconvolution was described. The success of the method was attributed in the paper to properly constraining the PSF estimate and the specimen estimate in the simulation studies. In the paper by V. Krishnamurthi, et al., "Blind Deconvolution of 2-D and 3-D Fluorescent Micrographs," Biomedical Image Processing and Three-Dimensional Microscopy, Proc. SPIE 1660, 1992, pp. 95–104, blind deconvolution was applied to deblur three dimensional fluorescent micrographs from real specimens. A further form of this procedure was described in a paper by T. J. Holmes, et al., "Deconvolution of 3-D Wide Field and Confocal Fluorescence Microscopy Without Knowing the Point Spread Function," Proceedings of Scanning '93, 1993, III-57–59, where the authors outlined the specific constraints on the PSF, on the basis that an empirical band-limit protocol has provided comparable results to deconvolution with the known PSF. These initial attempts to estimate images of specimens in the absence of complete knowledge of the PSF have several disadvantages. The method requires hundreds of iterations to converge to the final solution and, therefore, requires significant additional computation accelerating hardware to perform even a very modest size (64×64×64) 3-D image in a reasonable amount of time. The procedure constrains the PSFs using theoretically obtained bandlimit parameters, which generally are not appropriate. See, D. A. Agard, et al., "Fluorescence Microscopy in Three Dimensions, " Methods in Cell Biology, Academic Press, Inc., Vol. 30, 1989, pp. 353–377.

Blind deconvolution is also of interest in other applications of signal processing generally and image signal processing in particular. The application of maximum likelihood estimators using expectation maximization schemes for simultaneous blur and image identification in two dimensions has been actively pursued. See, e.g., M. I. Sezan, et al., "A Survey of Recent Developments in Digital Image Restoration," Optical Engineering, Vol. 29, 1990, pp. 393–404. Generally, these procedures have been computationally very intensive and require the use of computers with array processors to complete the processing in a reasonable amount of time. Other methods which have been proposed have the same disadvantages. See, e.g., B. C. McCallum, "Blind Deconvolution by Simulated Annealing," Optics Communications, Vol. 75, No. 2, 1990, pp. 101–105, which describes the use of simulated annealing, and B. L. K. Davey, et al., "Blind Deconvolution of Noisy Complex Valued Image," Optics Communications, Vol 69, No. 5–6, 1989, pp. 353–356, which describes the use of Weiner filtering for simultaneous blur and image identification.

SUMMARY OF THE INVENTION

The present invention provides a rapid and accurate restoration of a noisy signal obtained from an acquisition system to simultaneously determine an estimate of the true or ideal signal and the response function of the acquisition system. Such acquisition systems can include optical imaging systems, such as conventional and confocal microscopes, which produce signals corresponding to an image in which the ideal signal would represent the actual unblurred image at a particular focal plane, and can be extended to three dimensional images of three dimensional specimens in which multiple planes of data are utilized to produce a three dimensional array of data. The signal can also be a function of a four or higher dimensional variable and can be a function of a one-dimensional variable, e.g., a function of time or of linear direction. The present invention does not require prior knowledge of the response function of the acquisition system, so that there is no need to calibrate the acquisition system before acquiring a signal, e.g., before each specimen is measured in a microscope. The invention provides an extremely efficient process with convergence to a satisfactory estimate much more rapidly than previous processes, with fewer iterations required and fewer manipulations required for each iteration.

The invention further allows the sensitivity of the signal processing system to be adjusted to the level of noise in the output signal of the acquisition system instrument. By estimating the noise variance in the output signal, the sensitivity of the signal processing of the invention can be adjusted to best suppress the effects of noise. Moreover, the invention can be applied to local overlapping segments of signal data under conditions in which the response function is changing over the signal, so as to obtain a locally accurate estimate of the response function and the ideal input signal for the particular segments of signal.

If the acquisition system response function is changing over the entire set of acquired signal, the present invention first obtains the signal g from the acquisition system, stores the signal data in a memory, and utilizes a processing means in the signal processor to divide the signal data into smaller overlapping segments, and then processes each segment separately so that the response function h can be assumed constant for this segment of signal while over the entire acquired signal it may be variable. For each signal segment, the parameters needed for constraining the impulse response function and the signal function are first determined. If the response function over the entire signal data set is substantially constant, the signal data need not be segmented, and the procedure can be carried out on the entire signal data set. The parameters include estimates of the background signal level, noise variance, and frequency bandlimits of frequencies of interest in the signal g. If the signal g is a function of a multidimensional variable, the parameters are determined with respect to each dimension and preferably along orthogonal directions. An iterative procedure is then started to estimate the ideal signal f using an initial selected estimate of the response function, preferably a unit impulse function. Constraints in the spatial domain are applied to the resulting estimate of f, which is then used to obtain an estimate of the response function h. Constraints are then applied to the resulting estimate of h in both the spatial domain and the frequency domain. The updated estimate of h is then used to estimate f, and the cycle is repeated until a selected criterion is met indicating that acceptable results are obtained. The estimates of f and h are updated in the frequency domain using the transforms of f and h, wherein the iteration drives the transforms of f and h toward convergence in the frequency domain. Where the entire acquired signal is divided into multiple segments of overlapping signal data, the iterative procedure is repeated for each of the individual segments, and the resulting estimates of the actual signal data for each of the segments are merged together to provide a global estimate of the actual signal. The apparatus of the invention may then display the estimated signal as an image to the user, for example, a 2-dimensional display on a video monitor of a microscope image, and, if desired, can display the estimated impulse response function, or the functions corresponding to individual segments where the original signal data are segmented.

Further objects, features and advantages of the invention will be apparent from the following detailed description when taken in conjunction with the accompanying drawings.

DETAILED DESCRIPTION OF THE INVENTION

Figure 1:
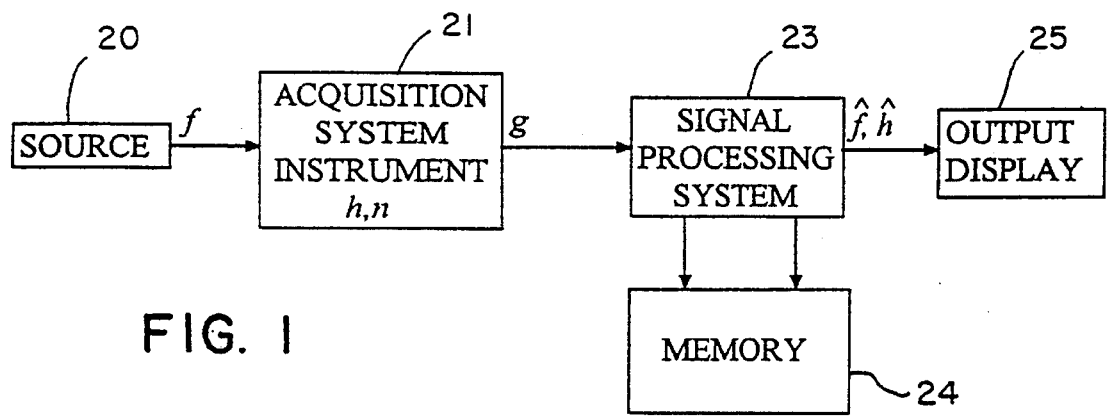
FIG. 1 is a block diagram illustrating the present invention.

The present invention provides improvement of signal information which may be acquired from various sources, in the presence of noise, to reduce the effect of the noise and to compensate for the distortions introduced by the acquisition system. This process is illustrated in FIG. 1 in which a source 20 provides true information, corresponding to a true or ideal signal "f", to an instrument (acquisition system) 21 which has an (unknown) impulse response h. The acquisition system 21 also receives (or generates) noise n, and provides an output signal g which is a distorted version of the f corrupted by the noise n. A signal processing system 23 stores the signal g as digital signal data in a memory 24 and utilizes the signal data g to provide an estimate $\hat{f}$ of the actual source signal f and an estimate $\hat{h}$ of the acquisition system impulse response h. These estimates are provided to an output device 25, which may be an off-line storage device, computer memory, hard copy output, video display, flat panel display, and so forth. Typically, in accordance with the present invention, the signal estimate $\hat{f}$ is displayed on a display device as a two-dimensional image.

There are many types of physical signal acquisition systems to which the present invention is applicable. Examples include optical microscopes including widefield and confocal microscopes, scanning electron microscopes, scanning transmission electron microscopes, many other spectroscopy instruments including X-ray, infrared, etc., and one and two dimensional gel electrophoresis. By way of example only, a specific application of the present invention is to a confocal microscope system shown generally in FIG. 2. The confocal microscope system includes an optical microscope 31 which examines a specimen placed on a stage 32. The specimen may comprise, e.g., biological cells, microcircuit components, etc. Confocal microscopy is especially advantageous in the examination of biological structures such as cells which have three dimensional form. One of the advantages of the confocal microscope is the ability to focus at focal planes at various levels in the cell to provide a set of "slices" through the cell which constitute light reflected or transmitted from the focal plane at the selected level in the cell. In the microscope system of FIG. 2, the light transmitted through or reflected from the structures at the selected focal plane in the specimen constitute the source 20 of FIG. 1. This light is received by the microscope 31 and transmitted via optical couplings 34 to a laser scanning confocal microscope analysis system 35. The laser scanning confocal microscope system 35 and the optical microscope 31 together constitute an acquisition system, which provides the output signal g in the form of an electrical output signal in digital form on a line 36 to a computer processor 38. The computer 38 can provide various types of signal processing on the signal data to provide displays of the signal data on a video monitor screen 40. Such laser scanning confocal microscope systems are well known. An exemplary confocal microscope system is the Odyssey® laser scanning confocal microscope sold commercially by Noran Instruments, Inc. of Middleton, Wis. An exemplary suitable confocal microscope system is set forth in U.S. Pat. No. 4,863,226 to Houpt, et al., Confocal Laser Scanning Microscope, the disclosure of which is incorporated by reference. For the reasons described above, in such confocal microscope systems, the impulse response function may vary across each two-dimensional slice of image signal data through the specimen and also from slice to slice in the axial direction of the microscope. Further, some light originating from positions away from the pixel being scanned at any instant in the confocal microscope will be received by the detector in the microscope system and will corrupt the image signal data. The present invention compensates for such distortions, and also minimizes the effect of noise which may come from various sources, to provide two- and three-dimensional images for display on the video screen 40, or for use in other manners, in a much shorter period of time than has heretofore been possible.

As noted above, the effect of the acquisition system response function h on the signal f from the source in the presence of noise n may be expressed as $g = h z, 900 f + n$, where $z, 900$ represents convolution. The process to find the estimate $\hat{f}$ of the signal f is carried out in the signal processing system 23 of FIG. 1, which may comprise the computer 38 of the confocal microscope system of FIG. 2 (e.g., a Silicon Graphics Indy workstation, an IBM AT-PC, etc.), a dedicated computer within the laser scanning confocal analysis system 35, or in dedicated hardware components. If the impulse response function h of the acquisition system is known to vary over the entire set of signal data for the output signal g, or is believed to vary, the signal data g can be segmented by the processor 23 as indicated at the block 45 in FIG. 3 in a manner which is suitable for an overlap and save method. For confocal microscope signal processing, it is generally preferred that if the foreground information is black, the image is inverted to represent the image in optical density units as indicated at 46 in FIG. 3. The signal processor then proceeds at 47 to estimate h and f given the signal g. When the estimation is completed, the processed signal segments are put back together and displayed as an image as indicated at 48.

Figure 4A:
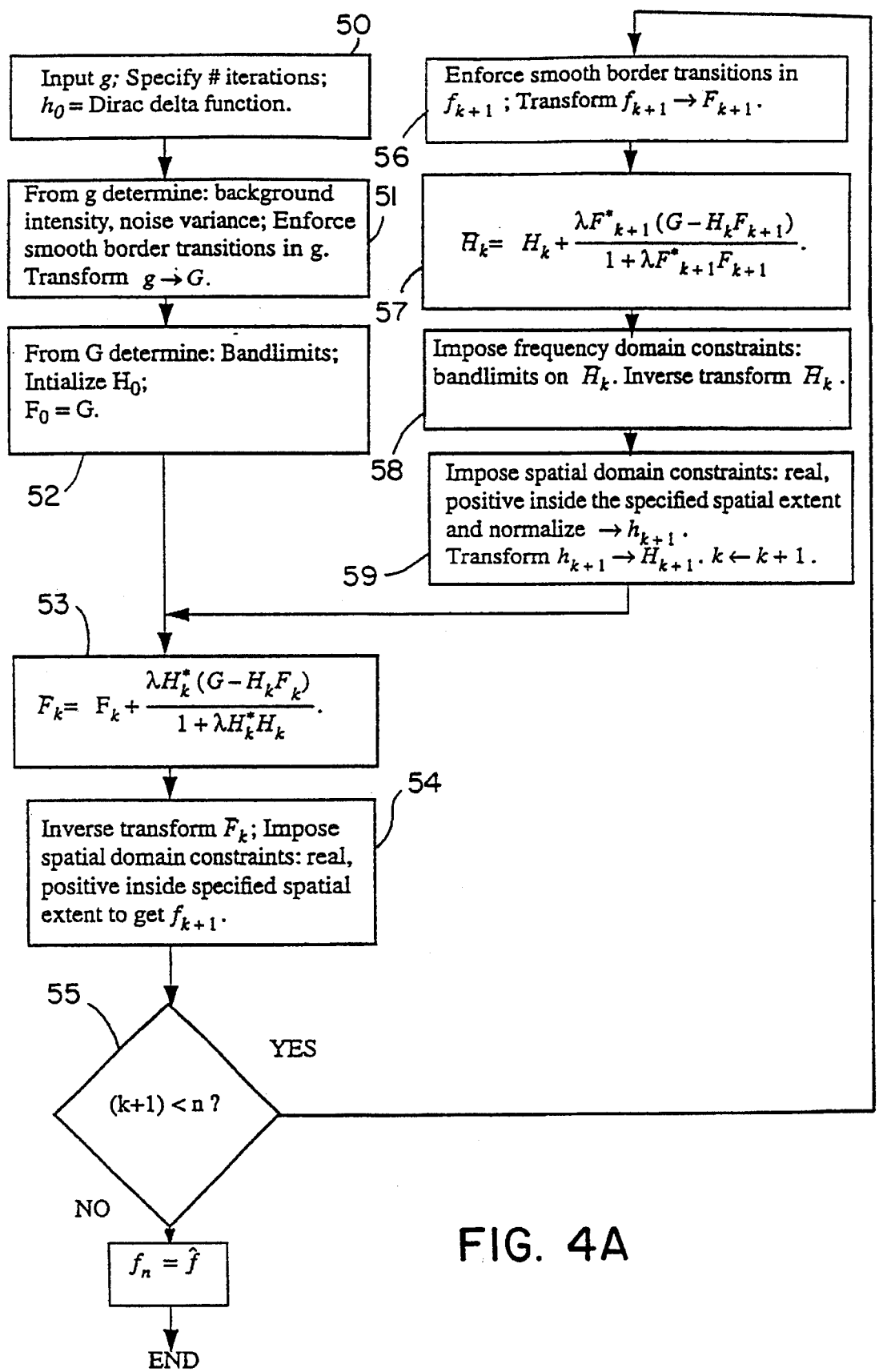
FIG. 4A is a flow chart illustrating the major steps carried out by the signal processing system to estimate the impulse response function h of the acquisition system and the ideal signal f.

A more detailed flow diagram of the signal processing of the invention is shown in FIG. 4A. In carrying out the present invention to restore signals from bandlimited distortions, both spatial and spatial frequency domain constraints are used in iterative processing. As used herein, the term "spatial" refers to signals which are functions of one or more variables, wherein the variables may be space, time, a combination of both, or other quantities. In the processing of visual image data from confocal microscopes, for example, the independent variable is a spatial vector in a three-dimensional array wherein each level in the array corresponds to one frame of data taken from a particular focal plane in the specimen. In the preferred processing of the invention, all of the parameters necessary for restoration are preferably computed from the observed signal data g. In the description of the processing set forth below, and shown in the flow diagram of FIG. 4A, lower case symbols represent signal entities (hereafter referred to as spatial domain entities) and upper case symbols represent the corresponding frequency domain entities. Transform operations are performed to transform spatial domain entities to the frequency domain and to inverse transform frequency domain entities to the spatial domain. Such transform operations can include Fourier transforms as well as other transforms, for example, Hartley and cosine transforms. The use of the Fourier transform is generally preferred because of well known characteristics and the availability of efficient computation processes such as the fast Fourier transform (FFT).

The process begins as indicated at block 50 wherein the input signal $f_0$ is initialized to the observed data g, the number of iterations is selected (or a convergence criterion may be selected) and the impulse response function $h_0$ is initialized to a selected function, e.g., the Dirac delta function. An advantage of using the delta function is that its Fourier transform is a (known) simple uniform function of frequency, so that the initial step of transforming $H_0$ can be eliminated, thereby saving one computational step. Moreover, the Dirac delta function satisfies a requirement of the PSF that the central pixel should have the maximum intensity.

The signal data g is examined as indicated at blocks 51 and 52 to address the considerations discussed below. This examination may be carried out manually with the aid of computer processing or may be carried out automatically by the signal processor:

(1) Spatial bounds on the signal. Where the impulse response function h is modeled as locally shift invariant but globally shift variant, processing is carried out on smaller segments of the signal. The signal sectioning may be carried out using well known overlap saving techniques. The edges of the signal are preferably padded to avoid inconsistencies that might arise when using circular convolution involving fast Fourier transforms (FFTs).

(2) Spatial frequency bounds on the impulse response function. These bounds are the most important constraints influencing the restoration of the impulse response function and hence that of the signal. Since it can be empirically shown that the theoretical impulse response function substantially differs from the empirically determined one, it does not make sense to use the theoretical parameters as has been done in the prior art. It is important to note that by restricting the parameters to theoretical values, one cannot restore a signal when spatially varying impulse response functions are involved. Instead, in accordance with the present invention, the spatial frequency bound for the unknown impulse response function is determined from the observed signal data g 13 as described below.

For a one-dimensional signal, the frequency spectrum of the signal g determined, for example, by performing an FFT on the signal data g, and the frequency spectrum is then plotted on a linear scale. For example, the plot of the frequency spectrum may be displayed to the user on the display device 25, which may be a video display terminal such as the video monitor screen 40 of FIG. 2. For two- and three-dimensional (2-D and 3-D) signals (or high dimensions), the sections of the spectrum in mutual orthogonal spatial directions are determined and plotted. For example, for a 3-D signal the FFT may be taken for signal data in x, y and z directions from a selected origin. In each of the plotted spectral sections, the zero frequency component (DC level or background) is preferably excluded. A characteristic pattern is generally evident from the plot, since it is the impulse response function of the instrument 21 and not the true signal which determines the bandlimit of the observed data. The extreme high frequency portion of the plotted spectrum is assumed to represent the underlying noise processes, and the cutoff frequencies in a signal in a given axis (e.g., along x, y and z axes for a 3-D signal) is determined by locating the point where the signal frequency content drops off to the noise content as one traverses on the spectrum from the high frequency end to the low frequency end. It should be noted that traversing from the low frequency end to the high frequency end using the above criterion can result in incorrect cutoff points because the spectral magnitude can have zeros. If the impulse response function is spatially varying, different bandlimits can be computed by sectioning the signal data as discussed above. Although there is no generally applicable theory which can be used for determining proper sectioning of a signal for which the response function varies, the signal can be sectioned into relatively small segments of a convenient selected size and then processed by determining individual bandlimits on the assumption that the response function is invariant over each small segment. Since the impulse response functions typically vary slowly across the entire signal, this assumption is usually valid.

(3) Spatial extent of the impulse response function. The spatial extent of the unknown impulse response function is also unknown. In the present invention, an upper bound on the spatial extent of the impulse response function is used. This upper bound on the spatial extent is preferably usually overestimated by empirical determination of blur extent around edges or sharp transitions in the signal in each dimension. Since the spatial extent of the truncated, bandlimited impulse response function is dependent upon the spatial frequency bound, one can use the spatial frequency bound to control the spatial extent as well. In cases where spatial extent is deliberately set to be larger than the one required, the impulse response function values are zero or very close to it provided the frequency bound is chosen properly as described above.

(4) Noise variance bound on the signal. The iteration procedure requires a parameter, designated herein as $\lambda$, which is computed from the noise variance bound on the signal. An upper limit for the noise variance can be computed either interactively or automatically. For 1-D signals, it is easier to interactively compute the noise variance by selecting a segment of the signal g where the variations are known to be due to noise only. A similar approach can be taken to compute the noise variance bound for 2-D signals. However, for well sampled 3-D signals, in which there are slight variations between the adjacent 2-D sections, an upper bound can be automatically determined by computing the variance of the difference sections. Difference sections are obtained by subtracting the constituting 2-D sections pairwise.

Estimation of the ideal signal and the impulse response function is then performed iteratively using a selected form of Landweber iteration for both the signal and the impulse response. The spatial frequency bandlimits, discussed above, are used to constrain the frequency domain estimate of the response function during each iteration, and constraining the estimates in this manner, with proper choice of the bandlimits, facilitates the processing of signals in accordance with the present invention much more rapidly than prior processing systems. This iteration is preferably and conveniently carried out in the signal processor 23.

Each iteration follows the following sequence (at iteration number k):

(1) given the existing estimate in the frequency domain of f, $F_k$, and the existing estimate in the frequency domain of h, $H_k$, determine an improved estimator $\bar{F}_k$ as $$F_{k2} = F_k + DH_k^*(G - H_k F_k) \tag{1}$$

where G is the frequency domain representation of the signal g and D is a bounded linear operator chosen such that $\|DH_k^* H_k\| < 2$, and "*" indicates complex conjugate. Several choices for the operator D are available. A preferred operator is such that $$DH_k^* = \frac{\lambda H_k^*}{1 + \lambda H_k^* H_k} \tag{2}$$

where $\lambda$ is the selected parameter discussed above. It is seen that as the estimators $H_k$ and $F_k$ approach the true functions, $H_k F_k$ should approach G, and $(G - H_k F_k)$ should approach zero.

(2) $\bar{F}_k$ is transformed to the spatial domain and the result is constrained to have real and positive values inside the selected spatial extent and zero outside to yield the updated estimate of f, $f_{k+1}$.

(3) The borders of $f_{k+1}$ are modified as conventional to take into account the periodic properties of the discrete Fourier transform.

(4) $f_{k+1}$ is transformed to the frequency domain to yield the updated estimate in the frequency domain $F_{k+1}$.

(5) The frequency domain estimate of h is then updated as an improved estimator $\bar{H}_k$ in accordance with:

$$\bar{H}_k = H_k + DF_{k+1}^*(G - H_k F_{k+1}) \tag{3}$$

where D is again a bounded linear operator. A preferred operator is $$DF_{k+1}^* = \frac{\lambda F_{k+1}^*}{1 + \lambda F_{k+1}^* F_{k+1}} \tag{4}$$

It is seen that as the estimates improve, $(G - H_k F_{k+1})$ should approach zero.

(6) The chosen frequency domain bandlimits are applied to $\bar{H}_k$ to eliminate frequency components above the selected bandlimit in each spatial frequency axis, the result is transformed to the spatial domain, and the result in the spatial domain is constrained to be real and positive inside the selected spatial extent and zero outside, and then the data values are normalized—for example, so that the sum of all values constituting the updated estimate $h_{k+1}$ is equal to one.

(7) If the iterations have not been completed, the updated estimate $h_{+1}$ is transformed to the frequency domain to provide $H_{k+1}$, and the iterative procedure above is repeated.

The iterations are completed and the final estimates of f and h are made when a selected criterion reached. For example, this criterion may be simply that a prechosen number of iterations have been completed, or it may be related to the amount of change of the estimates during an iteration.

An implementation of this iterative processing is illustrated in FIG. 4A. The signal update is performed at block 53 using the relation:

$$\bar{F}_k = F_k + \frac{\lambda H_k^*(G - H_k F_k)}{1 + \lambda H_k^* H_k}, \tag{5}$$

where k is the iteration number and H* is the complex conjugate of H. As discussed above, the parameter $\lambda$ may be selected based on empirical considerations from examination of the signal g or from prior experience with similar data or instruments, or it may be computed as the Lagrange multiplier of the minimization of the following convex constraint during the first iteration:

$$\text{minimize } \|\bar{f} - f_p\|^2, \tag{6}$$
$$\text{subject to } \|g - (h \otimes \bar{f}_p)\|^2 = \delta_v$$

where for an N-vector x, $$\|x\|^2 = \sum_{i=0}^{N-1} x_i^2,$$

$\delta_v$ is the upper bound of the estimated noise variance and $f_p$ is the projection of the initial estimate of the signal onto a set containing $\bar{f}$ such that $$\|g - (hz,900\,\bar{f})\|^2 \leq \delta_v \tag{7}$$

The same $\lambda$ is used throughout the procedure, and the $\lambda$ is preferably computed in such a way that the noise variance is overestimated to avoid any problems with the restored signal stability.

The estimate in (5) is then updated (block 54) through the sequence:

* Take the inverse Fourier transform of $\bar{F}_k$ and constrain the result to be real and positive inside the selected spatial extent and zero outside to yield $f_{k+1}$

* Then, if the selected number "n" of iterations has not been completed (block 55), modify the borders of $f_{+1}$ to take into account the periodic properties of the discrete Fourier transform and take the Fourier transform of $f_{+1}$ to get $F_{k+1}$ (block 56).

The impulse response function update is then carried out in a manner (block 57) similar to the signal update:

$$\bar{H}_k = H_k + \frac{\lambda F_{k+1}^*(G - H_k F_{k+1})}{1 + \lambda F_{k+1}^* F_{k+1}} \tag{8}$$

The same X as before is used in the above equation, which is now updated (blocks 58 and 59) through the following sequence: impose frequency domain constraints on $\bar{H}_k$, take the inverse Fourier transform of $\bar{H}_k$, constrain the result to be real and positive inside the selected spatial extent and zero outside, and normalize it to obtain $h_{k+1}$, then take the Fourier transform of $h_{k+1}$ to obtain $h_{k+1}$, where normalization refers to dividing all the elements of $h_{k+1}$ by their sum so that they add up to unity. In some cases, such as those encountered in 3-D optical microscopy, observed attenuation can be incorporated here by ensuring that the impulse response function sums up to an appropriate positive number representing an attenuation factor which is smaller than unity. The process then returns to blocks 53 and 54 to update $f_{k+1}$.

Figure 4B:
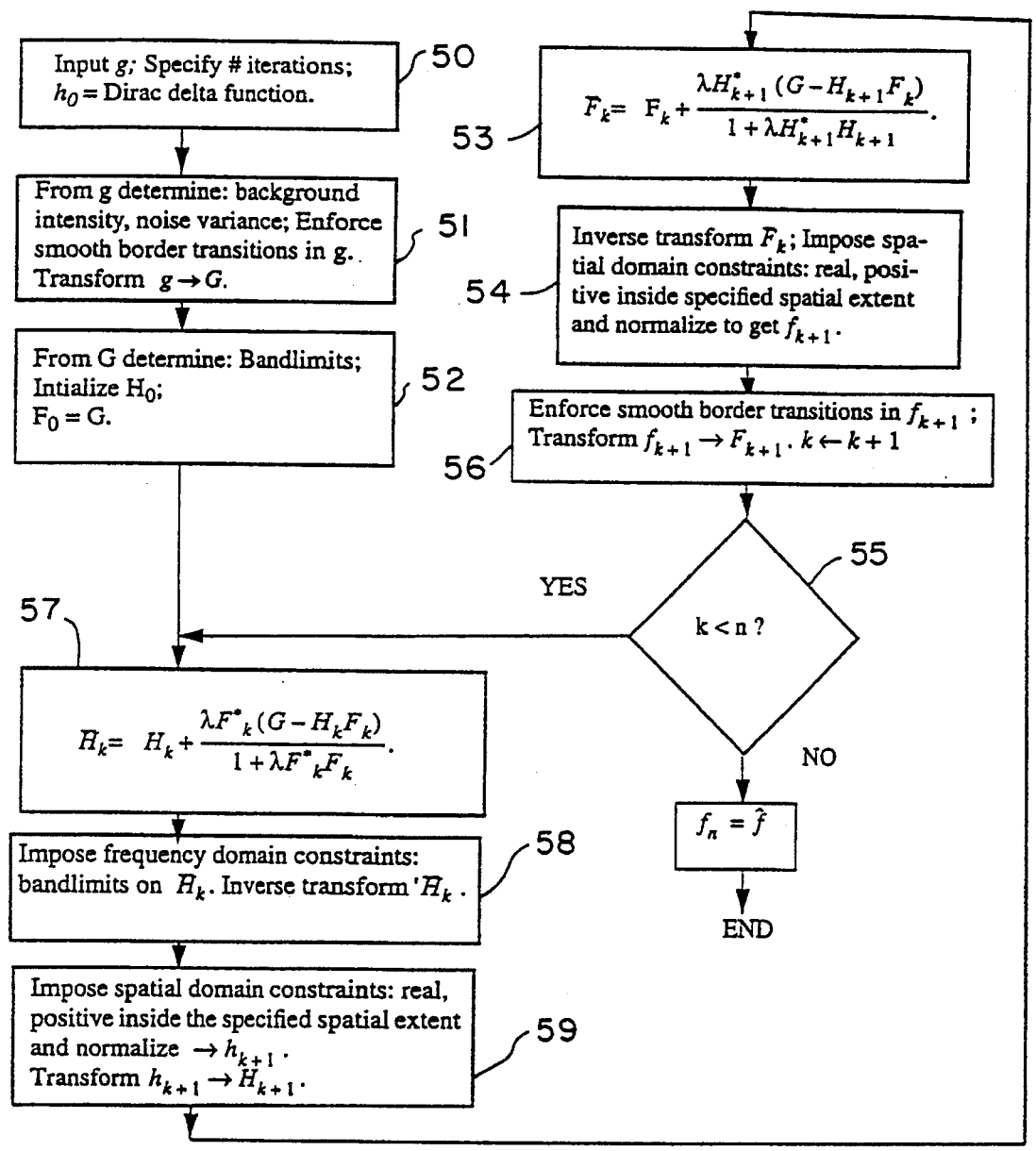
FIG. 4B is a flow chart illustrating a variation of the sequence of steps of FIG. 4A which may be carried out by the signal processing system.

A decision is then made at 55 whether to continue the iterations. This may simply involve determining whether a preselected number "n" of iterations have been completed; alternatively, if successive updates of ĥ and f̂ do not change by more than prespecified limits, e.g., $$\sqrt{\frac{\|f_{k+1}-f_k\|}{\|f_{k+1}\|}} \leq \alpha_1 \text{ and } \sqrt{\frac{\|h_{k+1}-h_k\|}{\|h_{k+1}\|}} \leq \alpha_2, \quad (9)$$

where $\alpha_1$ and $\alpha_2$ are preselected numbers, then the iteration continues. When the iterations are completed, constitutes the estimate f̂ and $h_{k+1}$ constitutes the estimate A variation on this process sequence is shown in FIG. 4B. In this alternative sequence, $H_{k+1}$ is determined first at blocks 57, 58 and 59, and then the process proceeds to determine $f_{k+1}$ and $F_{k+1}$ at blocks 53, 54 and 56. Zf the selected number of iterations has been completed, as determined at block 55, the last updated estimate of f, $f_n$, is used as the final estimate f̂ if not, the process continues through blocks 57, 58 and 59.

Figure 5:
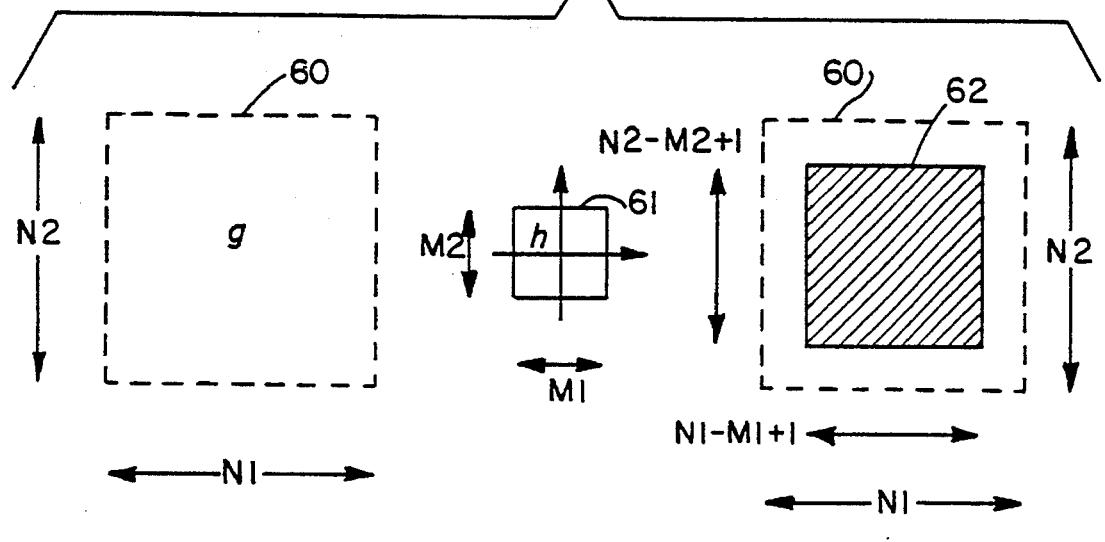
FIG. 5 is a simplified diagram illustrating the spatial extent of the result of deconvolution on two dimensional data.

FIG. 5 schematically illustrates the result of deconvolution for an exemplary two-dimensional signal which represents a two dimensional image. A two-dimensional set of signal data g, indicated generally within the dashed line 60 of FIG. 5, has a size N1×N2. This signal data set may comprise, for example, a signal corresponding to two-dimensional set of pixels which constitute a single frame of data from a confocal microscope taken at one focal plane, with the value of the signal g at each pixel being the detected light intensity at that pixel. The signal g is deconvolved by a point spread function (PSF) h, indicated within the line labeled 61 in FIG. 5, which has a size M1×M2, which generally is smaller than the set of signal data g. The result of the deconvolution operation, to provide the estimate f̂, is shown within the line 62 of FIG. 5, and will be of a size (N1−M1+i)×(N2−M2+1). This result will also apply to single dimensional data or to three dimensional and higher dimensional data.

Figure 6:
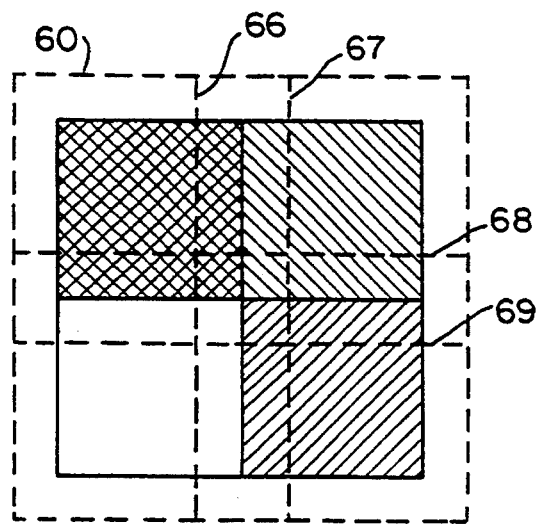
FIG. 6 is a simplified diagram illustrating the manner in which signal data can be segmented, processed by segment, and the results of the processing pieced together, illustrated for two dimensions.

FIG. 6 illustrates the operation of the overlap-save method of partitioning the set of signal data for a two-dimensional signal. For example, the set of signal data 60 of FIG. 5 may be divided into four overlapping regions, each one of which is bounded in part by the outer boundary 60, the four regions also being bounded by the lines 66–69, lines 68–66, lines 68–67, and lines 69–67, respectively. If the set of signal data 60 is larger, and smaller regions are desired, more than four regions can be created. Each of the four regions illustrated in FIG. 6 is deconvolved separately in accordance with the process above to obtain estimates of the actual signal f within each region. The resulting regions for which the estimated signals f̂ are obtained are illustrated by the shaded rectangles in FIG. 6. The section of signal data which is used to obtain the signal estimate within the shaded rectangle is the dotted rectangle which surrounds the shaded rectangle. This is similar to the relationship between the initial set of signal data 60 and the estimated signal data 62 of FIG. 5. With proper choice of the regions, the junction between the regions covered by the estimated signal is seamless, as indicated in FIG. 6. Again, the procedure can be extended to one-dimensional data or to three or more dimensional data.

As indicated above, the parameter $\lambda$ is determined based on the noise variance in the signal data g. While $\lambda$ will generally be chosen based on the considerations discussed above for a particular instrument to which the present invention is applied and the actual noise level, the values of $\lambda$ can be empirically determined based on experience with a particular instrument. In practice, it is typically necessary to scale down the PSF by a factor of 10 to avoid numerical inaccuracies and then rescale the result appropriately to account for this scaling. Therefore, the $\lambda$ values used in the discussion below are scaled up by 100. Accordingly, the variable sf (scale factor) in the computer program listing set forth further below is set to 10. For confocal microscopy involving three-dimensional signal data which is imaged and displayed, the values for A set forth in Table 1 below have been found to provide satisfactory performance based on the preferred criteria of the user for the visual image quality.

TABLE 1

| Visual Quality | $\lambda$ Range |
| --- | --- |
| Low blur and low noise | 5000–20000 |
| Low blur and medium noise | 1000–5000 |
| Low blur and high noise | 100–1000 |
| Medium blur and low noise | 2000–5000 |
| Medium blur and medium noise | 500–2000 |
| Medium blur and high noise | 100–500 |
| High blur and low noise | 800–2000 |
| High blur and medium noise | 100–800 |
| High blur and high noise | 10–100 |

As used in Table 1 above, high, medium, and low noise levels correspond to signal-to-noise-ratios less than 15 dB, between 15 dB and 30 dB, and greater than 30 dB, respectively. As a further example, it has been found that most images obtained utilizing the Odyssey® confocal microscope system after 32 frame averages fall within the medium noise category. Thus, a value of $\lambda$ in the range of 1000 is typically satisfactory for most applications with such an instrument.

Figure 7A:
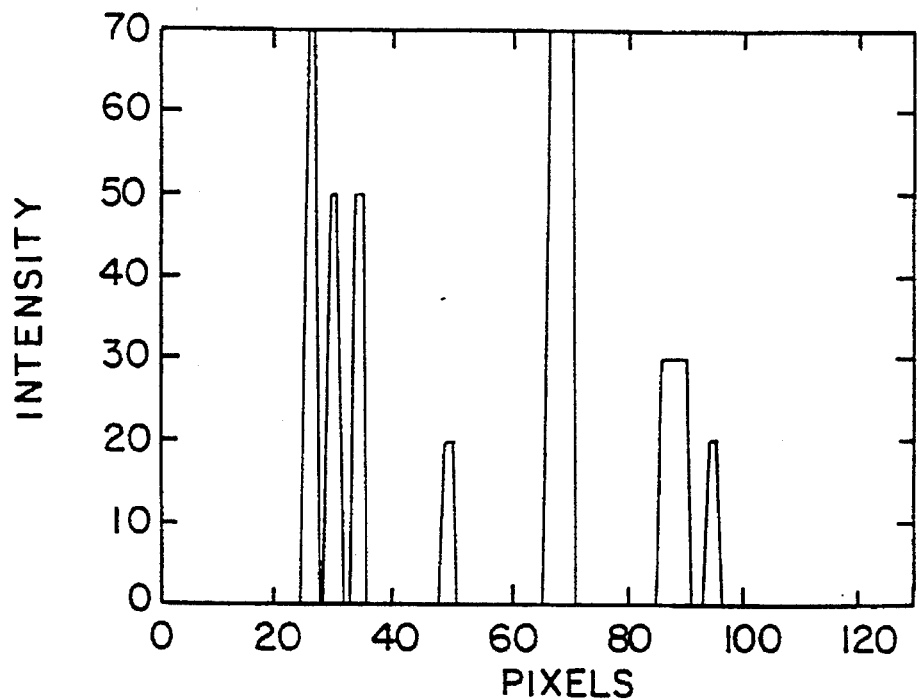
FIGS. 7A–7F are graphs illustrating the application of the invention to a one-dimensional set of synthesized signal data.
Figure 7B:
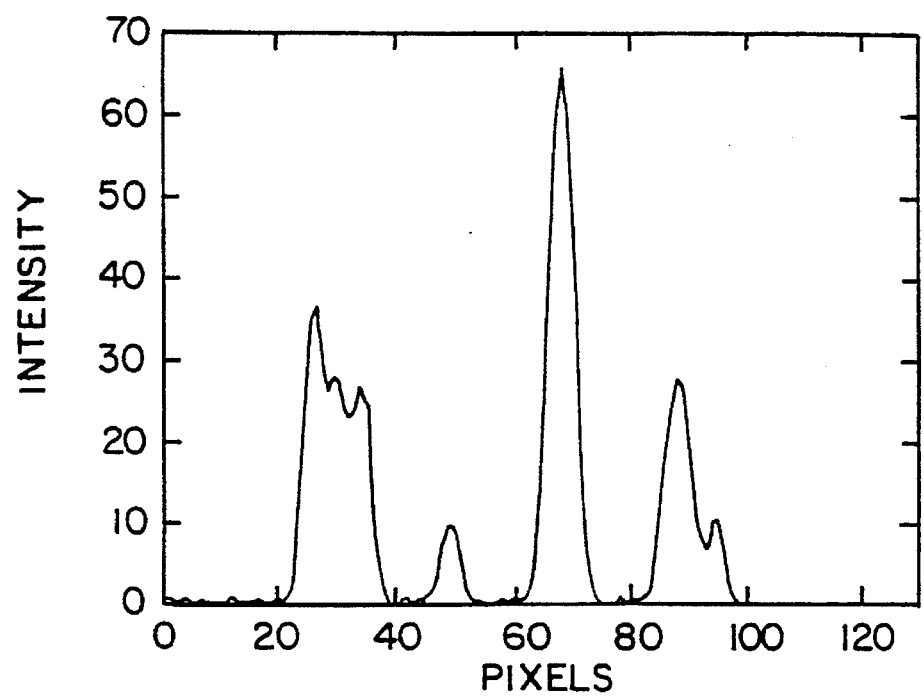
Figure 7C:
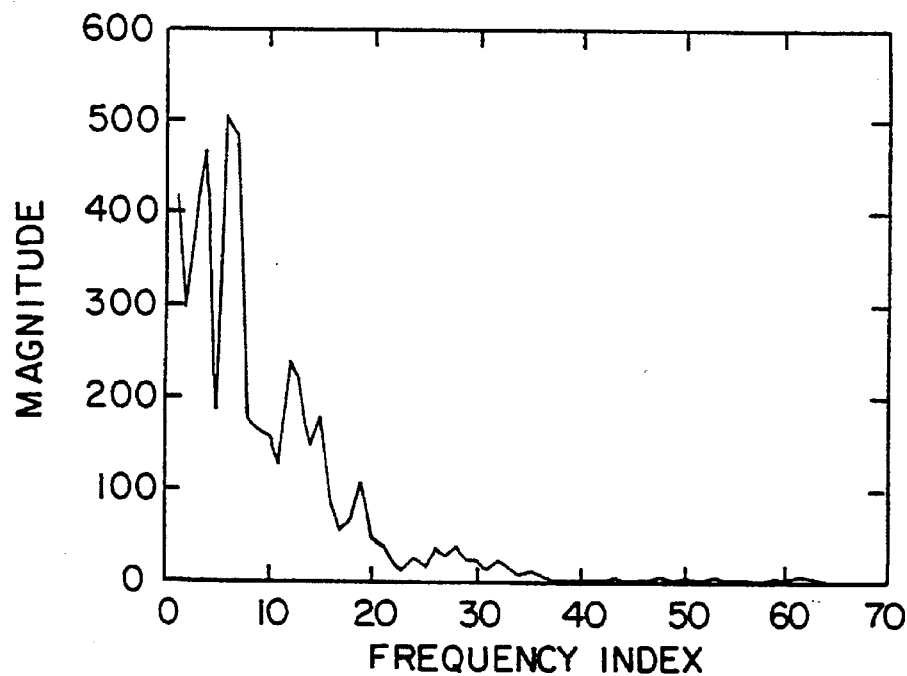
Figure 7D:
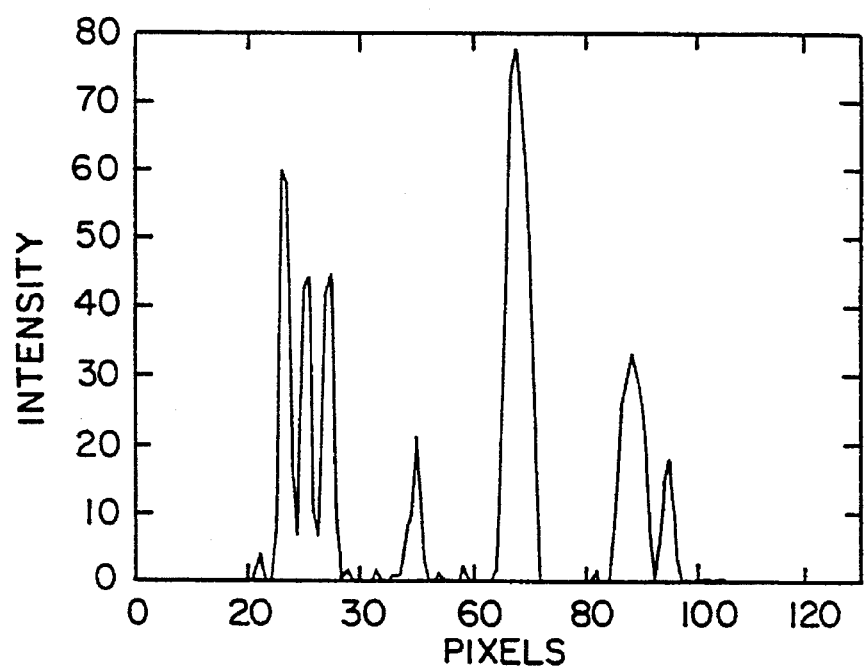

The application of the invention to a simplified one-dimensional simulated signal for purposes of exemplifying the invention may be illustrated with reference to the graphs in FIGS. 7A–F. The synthesized one-dimensional signal f (the ideal or actual signal) is shown in FIG. 7A. It was convolved with the Gaussian-shaped impulse response of FIG. 7E (the actual response function h), and zero-mean white noise was then added to obtain the degraded signal g shown in FIG. 7B. Although the signal g is represented as a function of pixel position in FIG. 7B, it could also be a function of any other one-dimensional variable, e.g., time. The severity of the degradation varies with the spread of the impulse response and the noise variance. The Gaussian function of FIG. 7E has a variance of 2, and the signal-to-noise ratio in the signal g is 30 dB. The power spectrum of the signal g is shown in FIG. 7C. The restored estimated signal f̂ is shown in FIG. 7D, which is seen to be a much closer approximation of the input signal f of FIG. 7A than the distorted signal g of FIG. 7B. The actual point spread function (PSF) of FIG. 7E may be compared with the estimated point spread function shown in FIG. 7F.

Figure 7E:
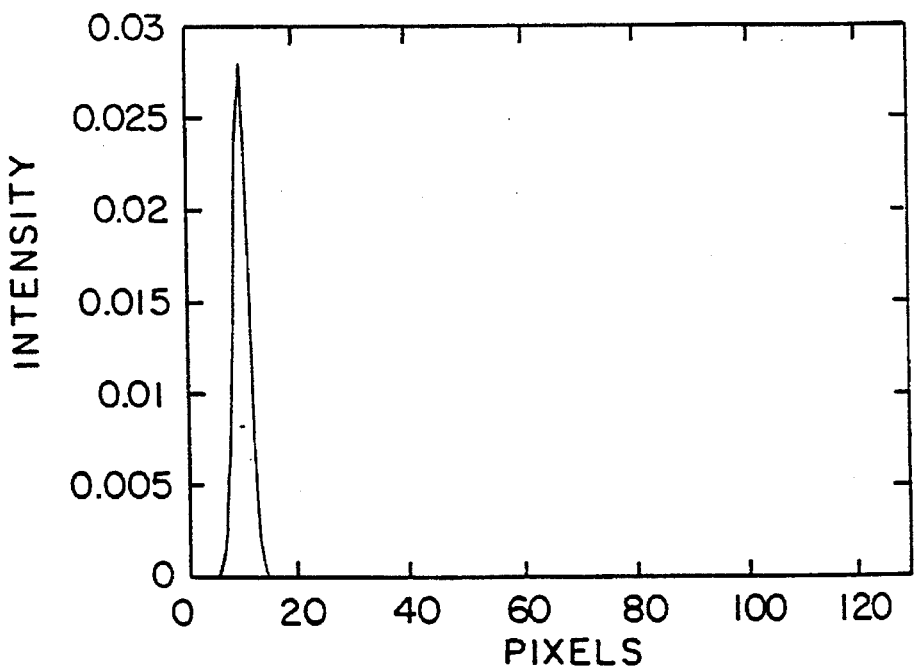
Figure 7F:
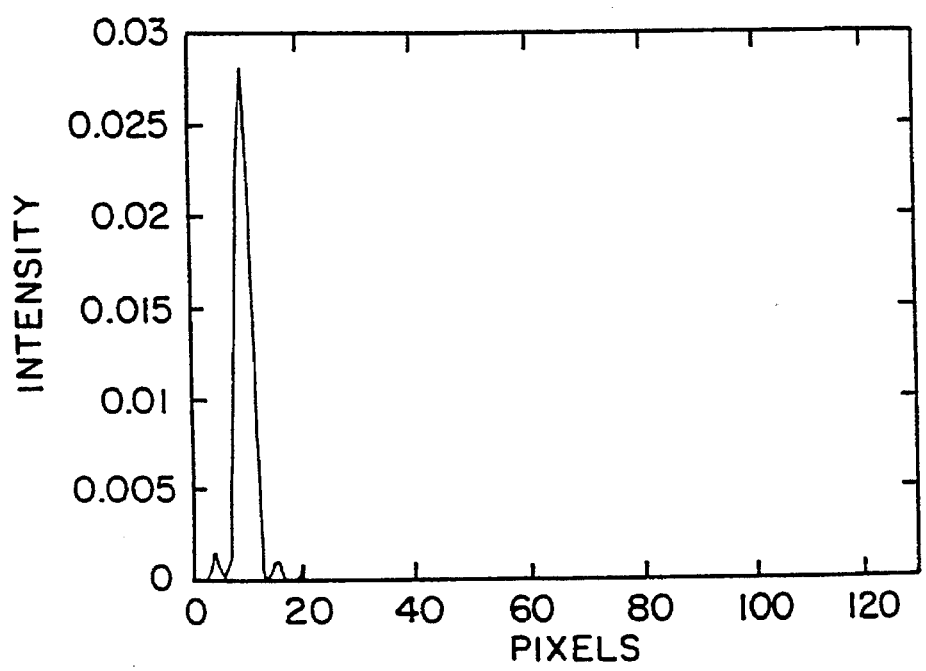
Figure 8A:
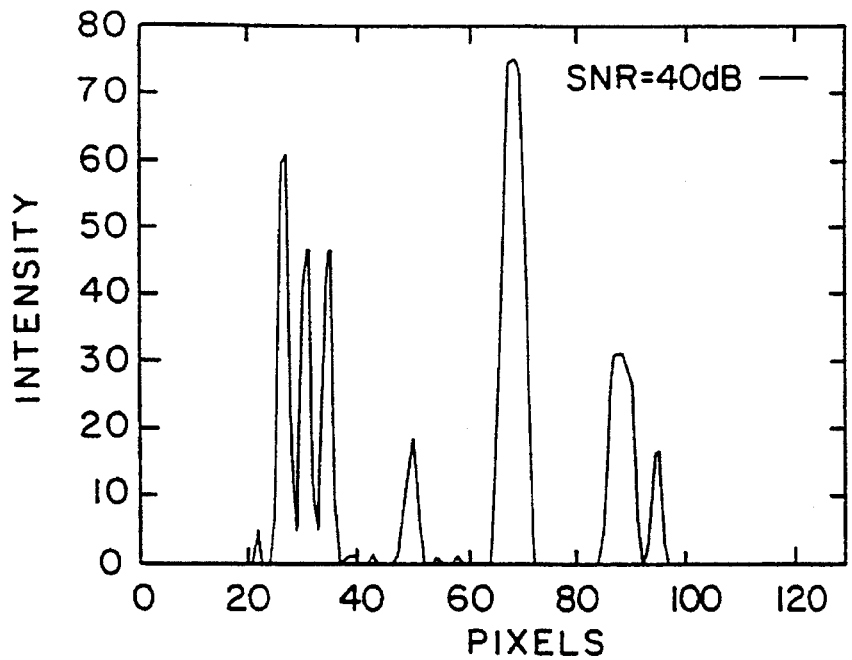
FIGS. 8A–8D are graphs illustrating the effect of changes in signal-to-noise ratio (SNR) in the application of the invention to the signal data of FIG. 7B.
Figure 8B:
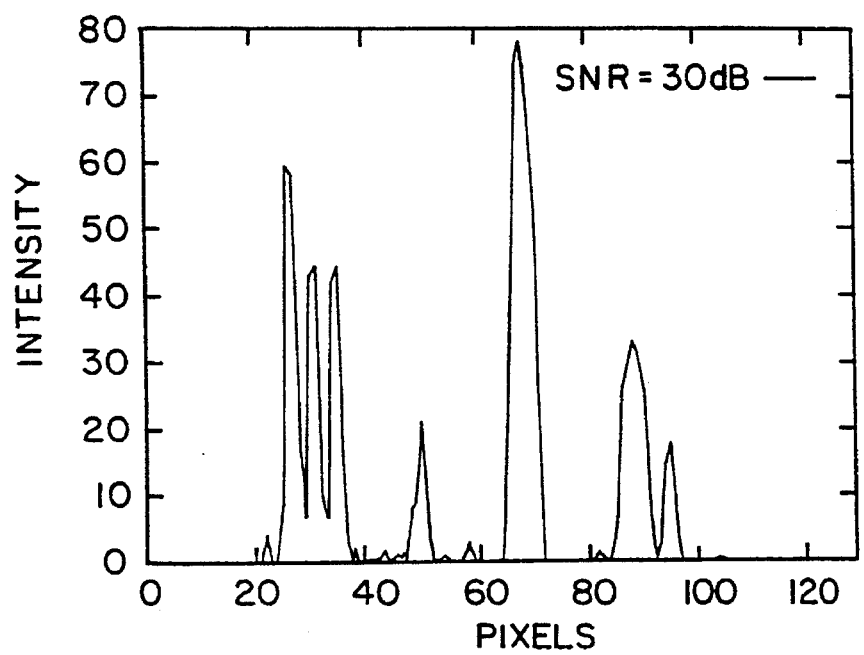
Figure 8C:
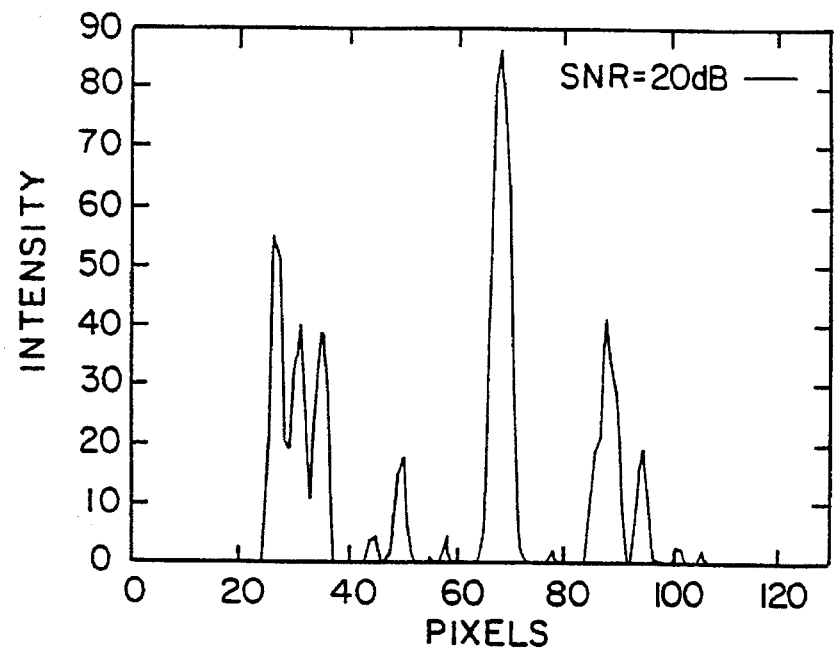
Figure 8D:
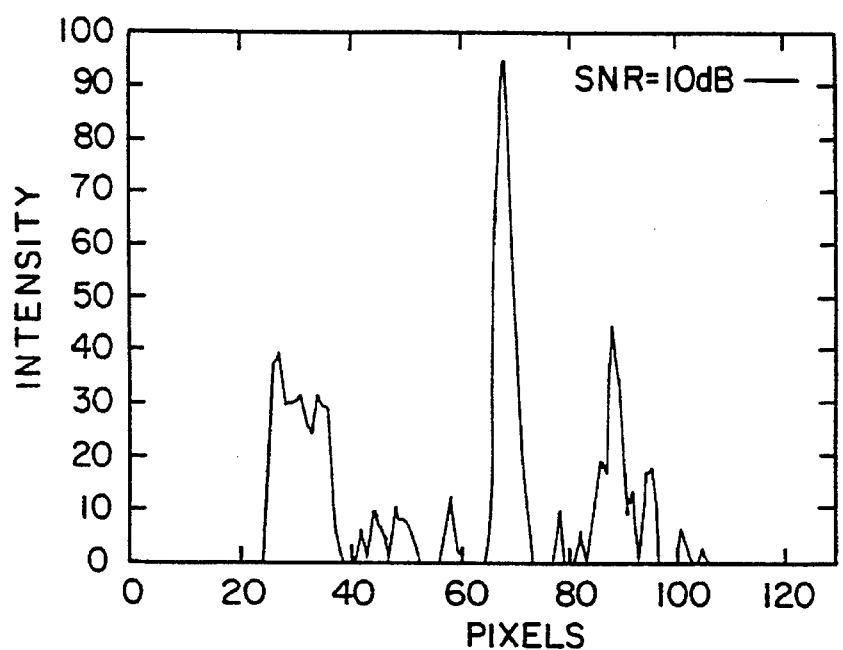
Figure 9A:
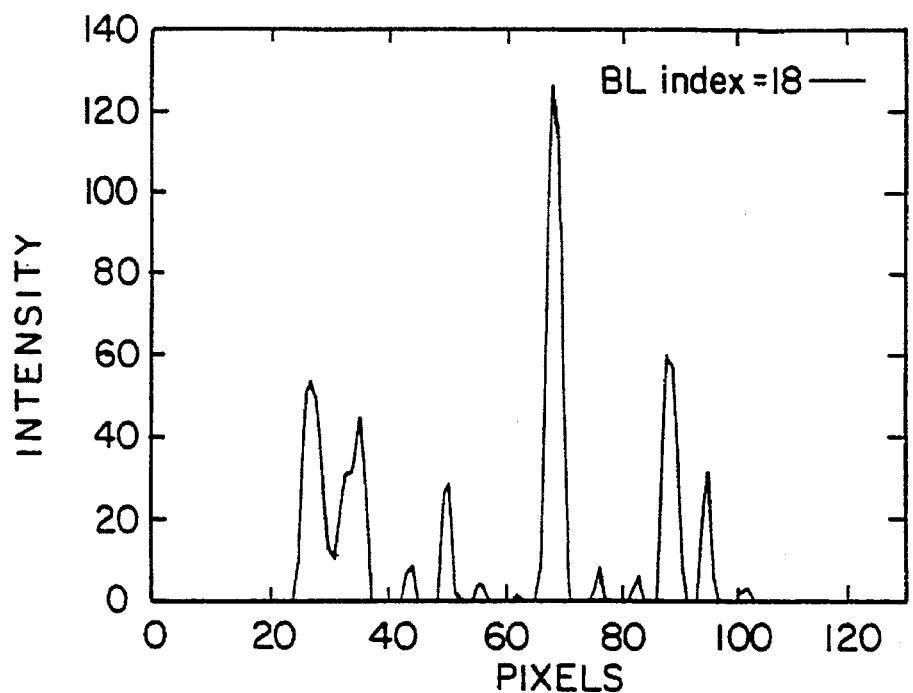
FIGS. 9A–9E are graphs illustrating the effect of changes in the selection of the bandlimit in the application of the invention to the signal data of FIG. 7B.
Figure 9B:
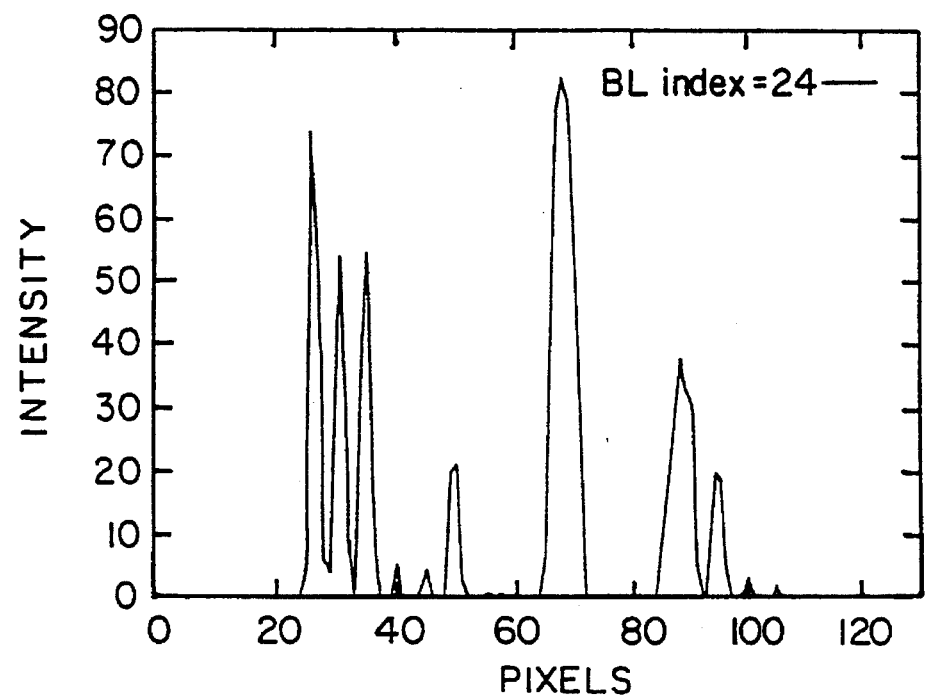
Figure 9C:
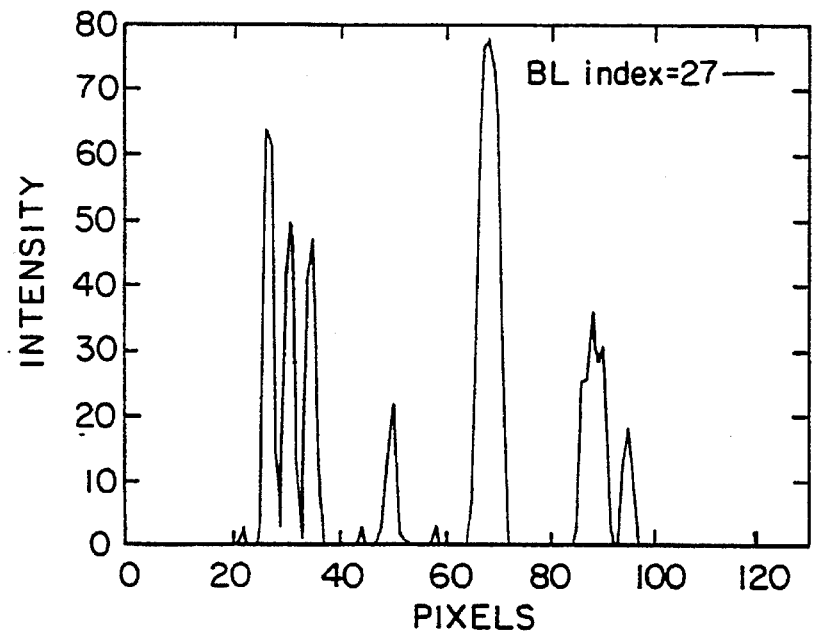
Figure 9D:
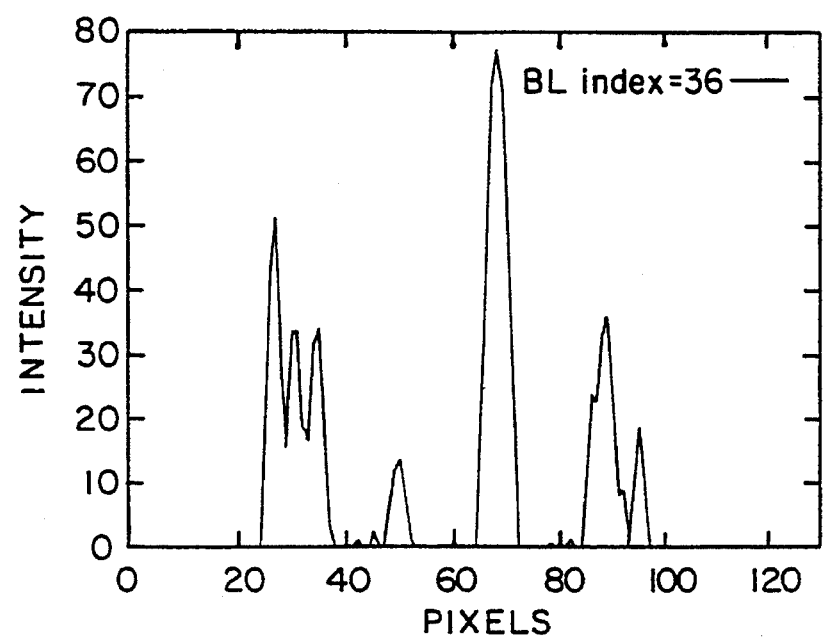
Figure 9E:
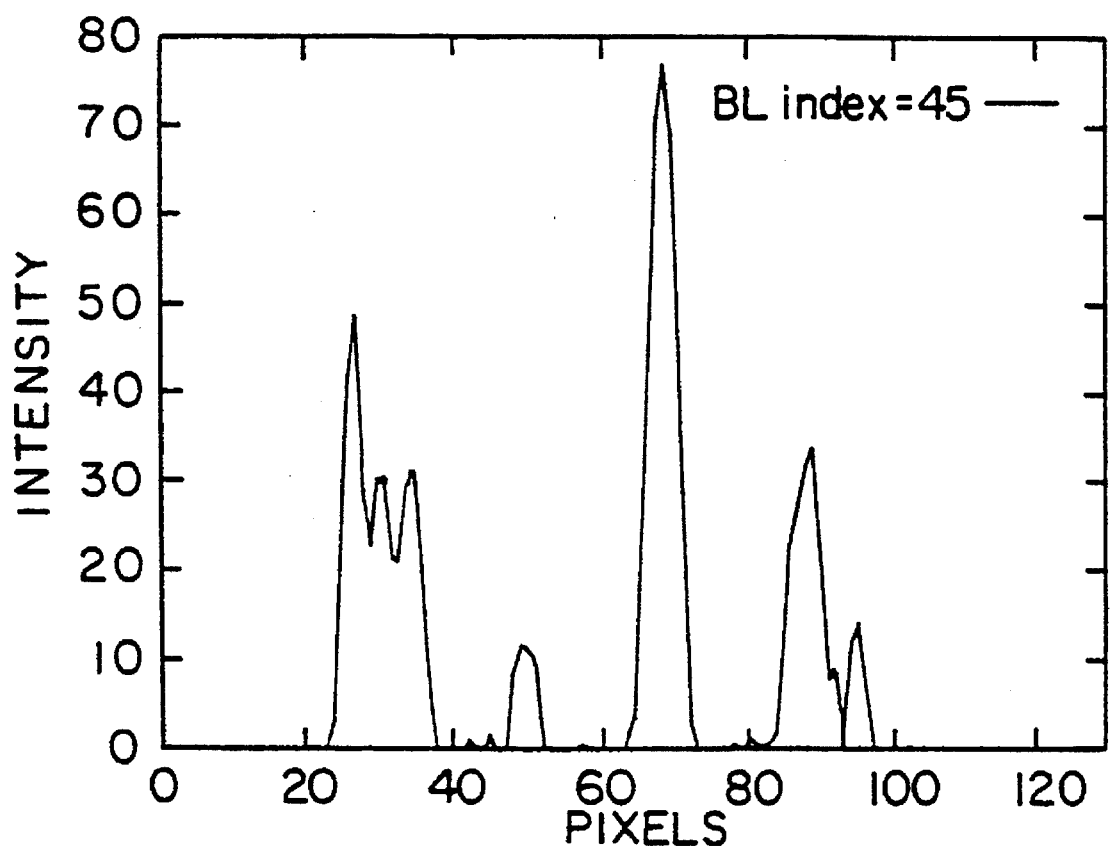

To perform this restoration in accordance with the invention as described above, the observed signal data g was used as an initial estimate of the signal f and a Dirac delta function was used as the original estimate of the PSF h. The spatial extent of the PSF was assumed to be unknown and was overestimated as 21 pixels wide, even though the true PSF was only 13 pixels wide (as shown in FIG. 7E). The spatial extent may be estimated from the spread of the transition portion of the peaks shown in the signal plotted in FIG. 7B. This spread is seen to be about seven or eight pixels, and it is generally preferable to overestimate the spatial extent by 200% to 300%. Consequently, 21 pixels were chosen. The noise variance was estimated using the portion of the signal g of FIG. 7B lying between pixels 10 and 20 (where there was no apparent signal data component). The bandlimit parameter was estimated from the power spectrum G of the signal g as plotted on a linear scale in FIG. 7C. A bandlimit of 29 was selected as being the upper frequency limit of useful (non-noise) information and was used for this restoration. It is seen from FIG. 7C that the magnitude spectrum tends to decline from frequency 29 up, with no distinct peaks which would indicate the presence of signal information at frequencies above 29. Similar estimations may be carried out on two- and three-dimensional (or higher dimensional) data by plotting the frequency spectrum obtained from signal data taken along each orthogonal axis.

Using the foregoing simulated data, the effects of various changes in system conditions on the process can be observed. FIGS. 8A–8D show the effect of increasing noise variance (corresponding to decreases in the SNR from 40 dB to 10 dB) in the signal estimate $\hat{f}$. Generally, with decreasing SNR, the fidelity of the restorations decreases in an expected manner.

If the PSF variance increases, the fidelity of the signal estimate also declines if the spatial extent of the PSF is also increased correspondingly. A similar decline in accuracy occurs as the PSF is made more asymmetric.

The effect of the bandlimit selection on the signal estimate $\hat{f}$ is illustrated-in the graphs of FIGS. 9A–9E, which show the results of the estimations $\hat{f}$ for bandlimits selected at frequencies of 18, 24, 27, 36 and 45, respectively. The bandlimit used to obtain the estimate of FIG. 7D was 29. These simulated results indicate that for this signal data, overestimation of the bandlimit causes more distortions than underestimating the bandlimit in the neighborhood of the correct estimate (where 29 is assumed to be the correct estimate).

Generally, it is not as necessary to accurately estimate the spatial extent of the PSF as the bandlimit for the signal g. In general, an accurate bandlimit estimation can automatically estimate the extent of the PSF. Even when the PSF extent is deliberately overestimated, a correct bandlimit estimate determined from the signal data g results in either zeros or insignificantly small values beyond the actual extent of the PSF. It should be noted that the spatial extent of the PSF must always be overestimated in order to take advantage of the influence of the bandlimit on the PSF spatial extent. However, the true spatial extent can be obtained by initially processing a small region or volume of data, and the estimate can then be used for the subsequent calculations.

It is well known in the restoration of bandlimited signals that the mean-squared-error decreases with iterations up to a certain limit and then starts increasing again. By appropriately choosing the bandlimit and the noise variance in the present invention as discussed above, one can converge in accordance with the procedure of the present invention in a fewer number of iterations at the expense of a small increase in the noise amplification in the final reconstruction.

In general, for signal-to-noise ratios encountered in practice (typically less than 30 dB), a PSF obtained using geometrical considerations (obtained with bandlimit and noise variance parameters determined from an analysis of the actual signal data) performs as well as one obtained with more rigorous considerations, and that even if the exact PSF cannot be reconstructed, if the PSF is sufficiently "close", reconstruction of the signal data can be obtained which is comparable to that obtained with exact prior knowledge of the PSF.

The simulation described above was carried out with one dimensional data. The present invention is also applicable to higher spatial dimensions. For example, in optical microscopy, the blurring function h is inherently three-dimensional for the reasons described above. For the deblurring of signals corresponding to two-dimensional images, the following procedures apply:

(a) Bandlimit Determination. The 2-D frequency spectrum may be analyzed along the u (reciprocal of x) and v (reciprocal of y) directions, since these directions are mutually orthogonal. The bandlimits are determined in these orthogonal directions in the same manner as in the one-dimensional case (e.g., by display of signal data and selection of parameters) and, thus, a rectangular frequency bound is established.

(b) Noise Variance Determination. Noise variance can be determined by choosing for examination a rectangular region where the image is visually determined to be uniform in intensity. If there is more than one such region available, the maximum variance in any of these regions is taken as the estimated noise variance. This provides a good upper bound for the noise variance.

There are various situations where it is desired to restore a blurry two-dimensional image in optical microscopy. Because the point spread function in such cases is three-dimensional, it has been suggested in the prior art that a projected 2-D point spread function may be inadequate. Although this may be true in general, substantial improvements in individual 2-D images can be obtained using the procedure of the present invention followed by adaptive smoothing to suppress noise in uniform intensity regions.

The present invention can also be extended to three-dimensional spatial variables, such as in 3-D optical microscopy, or higher dimensions. As in the 2-D case, the bandlimit is determined for signal data along mutually orthogonal directions, e.g., by display of the signal along such directions. The procedure is adequate, and may be modified if it is determined that a more accurate bandlimit is needed. If cones of missing frequencies do not permit a cuboidal shape of support, as in widefield microscopy, the procedure may be adapted as required to constrain the bandlimits.

Figure 2:
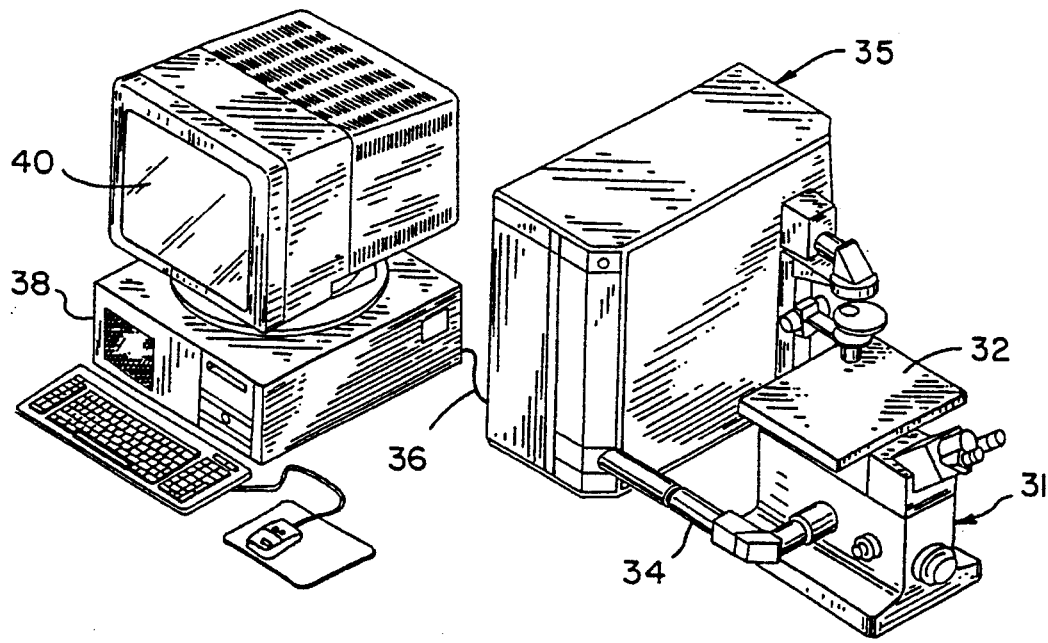
FIG. 2 is a simplified perspective view of the components of a confocal microscope system in which the invention is embodied for exemplification.
Figure 3:
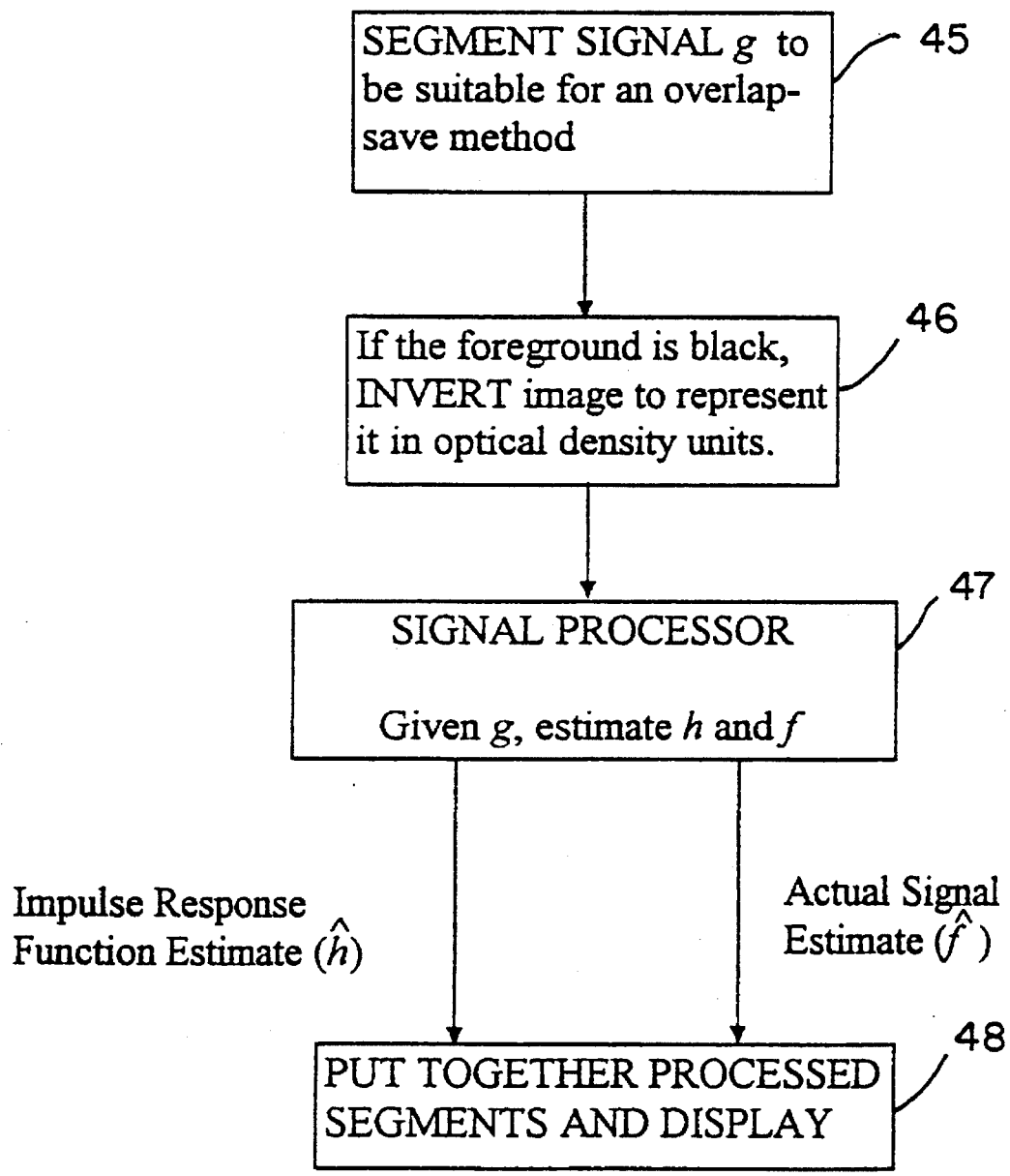
FIG. 3 is a flow chart of the major functions of the signal processing system of FIG. 1.

The present invention may be used with a confocal microscope system of FIG. 2 for 3-D fluorescence microscopy. The procedure is applicable for magnitudes of specimens which are obtained either by staining the specimen (for transmitted light) or by reflectivity (for reflected light). In transmitted microscopy, the image intensities are inverted and the procedure is then applied as discussed above. The present invention provides accurate estimations of the actual signal data which compare well with reconstructions obtained using the more laborious empirically determined PSFs for thin specimens. Moreover, the present invention provides much improved resolution for thick specimens for which, as a practical matter, the PSFs cannot be empirically determined. Under such conditions, if the prior approaches are used, either the data cannot be processed or it is processed with inaccurate PSFs and results are obtained which are not much improved from the original data. Traditionally, it has not been possible to deconvolve thick specimens (as can be done with thin specimens), including individual cells, for several reasons. First, it was not possible to accurately determine empirically the blurring function for a given specimen because of several factors which can influence the PSF of the observed data, including a refractive index mismatch, thickness of the specimen and the attenuation, and the wavelength of excitation. Secondly, the blur in a thick specimen is spatially variant, which does not match the assumptions in most of the known deconvolution procedures. Thirdly, the bandlimits on the PSF do change because of spatial variance of the PSF, and, therefore, theoretically obtained bandlimits are not appropriate for thick specimens.

In the present invention, all of the constraints that are applied are derived from the actual signal data g, and thus it is possible to apply the present invention to thick specimens.

There have been attempts to describe no-neighbor restoration of images which assume that either neighboring sections do not change in intensity or change linearly in intensity, and with the further assumption that the PSF is axially symmetric. The blind deconvolution process of the present invention can be applied to deblur 2-D images (ray summed) to expedite such restoration.

If images have a signal to noise ratio (SNR) less than 30 dB, simulation results have shown that the PSF obtained from geometric considerations in accordance with the present invention perform comparably to the more precisely obtained PSF using other techniques. Thus, for most practical applications, it is sufficient to use PSFs which are close to the true PSFs. If some prior knowledge about the PSF is available from empirical studies, the empirically determined PSF can be incorporated as the starting estimate in the present invention and can be recursively refined to obtain a more accurate PSF and a somewhat improved restoration. Where the empirically determined PSF is not available, the Dirac delta function is preferred as the starting estimate of the PSF, although other functions can be used. For example, a Dirac delta may be used as the starting estimate of H in the frequency domain.

The buildup of noise in restored images is inevitable when the main goal of the restoration is to obtain improved resolution. Therefore, the resolution procedure should optimize both resolution and noise enhancement. Generally, it is possible to get improved resolution at the risk of slightly higher noise amplification. If desired, detail preserving smoothing can be preformed.

As noted above, where spatially varying blurs are present, the data can be sectioned into smaller segments, and for each smaller segment, blur parameters can be individually determined. The procedures of the invention can, therefore, be applied when the blur in images varies slowly. Such slowly varying degradations are typical of X-ray spectroscopy (with increasing keV), two-dimensional gel electrophoresis (with increasing field strength) and in 3-D optical microscopy (with increasing axial depth).

Generally, the procedures of the present invention should not be used where there are abrupt changes in the blurring function, unless the response in such spatial regions can be determined in other ways, and the remainder of the image away from the abrupt change can be resolved by segmenting the data as discussed above.

The present invention thus provides rapid and accurate true signal estimation for spatial variables, including 1-D, 2-D and 3-D signals, allows computation of all the necessary parameters from the observed data, and typically yields acceptable restorations in very few iterations, typically five to ten. The PSF bandlimits can be determined in accordance with the invention from the power spectrum of the actual signal data. Both the PSF and the signal are simultaneously restored.

An exemplary computer program to be carried out within the signal processing system 23, e.g., the processing computer 38, to provide the signal processing operation of FIG. 4, is set forth below. This processing accepts the signal data g which has been stored in digital form in the memory 24 and provides an outlet signal, which is the estimate f̂, to a screen display (such as the video screen 40), to provide a two dimensional image of the estimated signal. The signal process operates using available functional modules, e.g., for performing fast Fourier transforms (FFT) and inverse transforms.

Copyright © 1994 Noran Instruments, Inc.
Gopal B. Avinash

```
/*
 *
 * This program is based on the blind deconvolution
algorithm
       of G. Avinash(1993).
 * It uses SGI fft library
 *
 */
#include <stdio.h>
#include <math.h>
#include "noran_data.c"        /* Image files reside here
*/
#define MAXARRAY 256
#define PI 3.1415926
#define psfsize 13
#define psfsizez 15
#define psfsize2 (int)psfsize/2
#define asize5 (int)psfsizez/2
#define asize6 psfsizez
#define freq_mult 10.
#define zarray   64            /* Max. number of images
*/
#define SWAP(a,b) tempr=(a);(a)=(b);(b)=tempr
float psf[psfsize][psfsize][psfsizez];
typedef struct
{
    float real,imag;
} COMPLEX;
struct {
    int x_orig1;
    int y_orig1;
    int z_orig1;
    int x_orig2;
    int y_orig2;
    int z_orig2;
} orig_cord;
COMPLEX *compsf, *compsfptr,*cominput,*cominputptr;
COMPLEX *comoutput,*comoutputptr,*workspace;
float *input1,*input1ptr;
float sine_array[1024];
int asize2,asize1,maximum,minimum,k,final;
float input_intensity,input_intensity1;
float lambda=1;
FILE *fopen(const char *, const char *), *fp,*filein,
*fileout;
    float sd,sf,rsf;
    float psf_sum,snr;
    int
psfsize3,psfsize4,psfsize5,asize3,asize4,x_edge,y_edge,z_edge;
    int x_size,y_size,z_size,xy_size,ym,yp,xm,xp;
    unsigned char *ifile1,*ifile1ptr;
    float gauss_fact[25];
    float maxout2,minout2,maxout,minout;
    float x_sum,y_sum,z_sum,y_sum1;
    int invert,datasize;
    int x_ext,y_ext;
    int imageslices,extra_slices;
    float alpha;
/**********************************************************/
    main(int argc, char **argv)
{
    int x,y,i,j,m,n;
    int fdi,count1,count2;
    if (argc <2)
    {
        fprintf(stderr, "Usage: sbii-3dd imageslices
non-invert=0/invert =1\n");
        exit(0);
    }
    sscanf(argv[1],"%d",&imageslices);
    sscanf(argv[2],"%d",&invert); /* Used for images with
bright
        backgrounds */
    printf("   Copyright (c) 1994\n");
    printf("        Gopal B. Avinash\n");
    printf("        NORAN INSTRUMENTS, Inc.\n");
    printf("        All Rights Reserved\n");
```

```
printf("\n");
    sf = 10.; /* scale factor = 10.0; */
rsf = 1./sf;
printf("\n");
printf("Starting coordinates (x y z) \n");
scanf("%d %d %d",&orig_cord.x_orig1, &orig_cord.y_orig1,
    &orig_cord.z_orig1);
printf("\n");
printf("x_size=\n");
scanf("%d",&x_size);
printf("y_size=\n");
scanf("%d",&y_size);
printf("z_size=\n");
scanf("%d",&z_size);
datasize = x_size*y_size*z_size;
alpha = 1./(float)datasize;
input1 = (float *) malloc(datasize*sizeof(float));
xy_size =x_size*y_size;
x_edge = x_size-psfsize2;
y_edge = y_size-psfsize2;
z_edge = z_size-psfsize5;
asize4 = psfsize2;
asize3 = psfsize;
orig_cord.x_orig2 = orig_cord.x_orig1+ x_size;
orig_cord.y_orig2 = orig_cord.y_orig1+ y_size;
orig_cord.z_orig2 = orig_cord.z_orig1+ z_size;
x_ext = orig_cord.x_orig2 - orig_cord.x_orig1;
y_ext = orig_cord.y_orig2 - orig_cord.y_orig1;
for(i=orig_cord.z_orig1;i<orig_cord.z_orig2;i++){
    input1ptr = input1+(i-orig_cord.z_orig1)*xy_size;
    read_image(image_name(i),i);
}
printf("Maximum Value of the input=%f\n",maxout2);
printf("Minimum Value of the input=%f\n",minout2);
asize1 = x_size;
asize2 = y_size;
printf("noise floor value of images= \n");
scanf("%f",&snr);
maxout2 -=snr;
input1ptr = input1;
for(i=0;i<imageslices;i++){
    for (y=0;y<y_size;y++){
        for(x=0;x<x_size;x++,input1ptr++){
            *input1ptr = (*input1ptr-snr);
            if(*input1ptr <0.) *input1ptr = 0.;
            if( maxout2< *input1ptr)maxout2=(*input1ptr) ;
            if( minout2> *input1ptr)minout2=(*input1ptr) ;
        }
    }
}
printf("Maximum Value of the corrected
input=%f\n",maxout2);
printf("Minimum Value of the corrected
input=%f\n",minout2);
/***********************************************/
printf("Enter the number of iterations wanted\n");
scanf("%d",&final);
for(i=0,x=1;i<asize4;i++,x++)
    gauss_fact[i] = exp(-(float)(x*x/asize3));
input1ptr = input1;
for(i=0;i<z_size;i++){
    for (y=0;y<y_size;y++){
        for(x=0;x<x_size;x++,input1ptr++){
            if((x>=x_edge)|| (y>=y_edge)|| (y=asize4)|| (x<asize4))
{
            if((x>=x_edge)&&(y>=asize4)&&(y<y_edge))
                *input1ptr = *(input1ptr-x+x_edge-1)+
                    (*(input1ptr-x+asize4)- *(input1ptr-x+x_edge-1))
                    *(x-x_edge+1) / (float)asize3;
            else if ((x<asize4)&&(y>=asize4)&&(y<y_edge))
                *input1ptr = *(input1ptr-x+x_edge-1)+ (-*(input1ptr-x
                +x_edge-1) + *(input1ptr-x+asize4))*(asize4+x)/
                (float)asize3;
            else if((y>=y_edge)&&(x>=asize4)&&(x<x_edge))
                *input1ptr = *(input1ptr-(y-y_edge+1)*x_size)+
                    (- *(input1ptr-(y-y_edge+1)*x_size)+
                *(input1ptr-(y-asize4)*x_size))*(y-y_edge+1) / (float)asize3;
            else if ((y<asize4)&&(x>=asize4)&&(x<x_edge))
                *input1ptr = *(input1ptr-(y-y_edge+1)*x_size)+
                    ( *(input1ptr-(y-asize4)*x_size) -
                *(input1ptr-(y-y_edge+1)*x_size))*(asize4+y) / (float)asize3;
            else if ((x<asize4)&&(y<asize4)) *input1ptr =
                *(input1ptr-(x-asize4)-(y-asize4)*x_size)*
                    gauss_fact[asize4-x]*gauss_fact[asize4-y];
            else if ((x>=x_edge)&&(y>=y_edge)) *input1ptr =
                *(input1ptr-(x-x_edge+1)-(y-y_edge+1)*x_size) *
            gauss_fact[asize4-x_size+x]*gauss_fact[asize4-y_size+y];
            else if ((x>=x_edge)&&(y<asize4)) *input1ptr =
                *(input1ptr-(x-x_edge+1)-(y-asize4)*x_size)*
                    gauss_fact[asize4-x_size+x]*gauss_fact[asize4-y];
            else if ((x<asize4)&&(y>=y_edge)) *input1ptr =
                *(input1ptr-(x-asize4)-(y-y_edge+1)*x_size)*gauss_
                    fact[asize4-x]*gauss_fact[asize4-y_size+y];
}
        }
    }
}
input1ptr=input1;
extra_slices = z_size-imageslices;
for(i=0;i<z_size;i++){
    for(y=0;y<y_size;y++){
        for (x=0;x<x_size;x++,input1ptr++){
            if(i>=z_edge){
                *input1ptr = *(input1ptr-(i-z_edge+1)*xy_size)+
                    (*(input1ptr-(i-asize5)*xy_size)-
                    *(input1ptr-(i-z_edge+1)*xy_size))*(i-z_edge+1)/
                    ((float)asize6);
            }
            else if(i<asize5){
                *input1ptr = *(input1ptr-(i-z_edge+1)*xy_size)+
                    ( *(input1ptr-(i-asize5)*xy_size)-
                    *(input1ptr-(i-z_edge+1)*xy_size))*(i+asize5)/
                    ((float)asize6);
            }
        }
    }
}
comoutput = (COMPLEX *) malloc(datasize*sizeof(COMPLEX));
input1ptr=input1;
comoutputptr=comoutput;
for(i=0;i<z_size;i++){
    for(y=0;y<y_size;y++){
        for (x=0;x<x_size;x++,input1ptr++,comoutputptr++){
            comoutputptr->real = *input1ptr;
        }
    }
}
/* Low-pass filter the edges of image with 3x3 mask */
input1ptr=input1;
comoutputptr=comoutput;
for(i=0;i<z_size;i++){
    for(y=0;y<y_size;y++){
        for (x=0;x<x_size;x++,input1ptr++,computputptr++){
            if((x>=x_size-asize4-1) || (y>=y_size-asize4-1)||
                (y<=asize4)|| (x<=asize4))
{
            if(x==0)xm=x_size-1;else xm = x-1;
            if(y==0)ym=y_size-1;else ym = y-1;
            if(x==x_size-1)xp=0; else xp = x+1;
            if(y==y_size-1)yp=0; else yp = y+1;
            comoutputptr->real = (*(input1ptr-(x-xm))+
                    *(input1ptr(x-xm)-(y-yp)*x_size)+
                    *(input1ptr-(x-xm)-(y-ym)*x_size)+
                    *input1ptr + *(input1ptr-(y-yp)*x_size) +
                    *(input1ptr-(y-ym)*x_size) +
                    *(input1ptr-(x-xp))+
                    *(input1ptr-(x-xp)-(y-yp)*x_size)+
                    *(input1ptr-(x-xp)-(y-ym)*x_size))/9.;
}
            else comoutputptr->real = *input1ptr;
        }
    }
}
/***********************************************/
free(input1);
cominput = (COMPLEX *) malloc(x_size*y_size*z_size
    *sizeof(COMPLEX));
compsf = (COMPLEX *) malloc(x_size*y_size*z_size
    *sizeof(COMPLEX));
workspace = (COMPLEX *)
malloc((x_size+y_size+z_size+45)*2
    *sizeof(COMPLEX));
cfft3di*x_size,y_size,z_size, workspace);
compsfptr = compsf;
```

```
cominputptr = cominput;
comoutputptr = comoutput;
for(i=0;1<z_size;i++){
    for (y=0;y<y_size;++y){
        for (x=0;x<x_size;++x,++compsfptr,++cominputptr,
                ++comoutputptr)
        {
            cominputptr->real = comoutputptr->real;
            compsfptr->real= rsf; /* Take 3-D fft of psf */
compsfptr->imag=cominputptr->imag=comoutputptr->imag=0;
        }
    }
}
maxout2=0.;
minout2 = 10000.;
comoutputptr=comoutput;
for(i=0;i<z_size;i++){
    for(y=0;y<y_size;y++){
        for (x=0;x<x_size;x++,comoutputptr++){
            if(comoutputptr->real<0) comoutputptr->real = 0;
            if(comoutputptr->real>maxout2) maxout2= comoutputptr->
                real;
            if(comoutputptr->real<minout2) minout2= comoutputptr->
                real;
        }
    }
}
printf("Maximum Value of the input=%f\n",maxout2);
printf("Minimum Value of the input=%f\n",minout2);
for(i=0;i<z_size;i++)
    write_image(input_name(i),i,1);
/* -1 is for the forward fft */
cfft3d(-1,x_size,y_size,z_size,cominput,x_size,y_size,
    workspace);
printf("The band-limit support parameter is very
important
    \n");
printf("for the convergence of the algorithm. Choose the
    \n");
printf("value so that you overestimate it (in your
opinion)
    \n");
printf("\n");
cominputptr = cominput;
comoutputptr = comoutput;
x_sum = 0;
for(i=0;i<z_size;i++){
    for(y=0;y<y_size;++y){
        for (x=0;x<x_size;++x,++cominputptr,++comoutputptr)
        {
            comoutputptr->real = cominputptr->real;
            comoutputptr->imag = cominputptr->imag ;
            if((x<x_size/2)&&(i==0)&&(y==0))
                printf*"%d
%f\n",x,hypot(comoutputptr->real,comoutputptr->imag));
        }
    }
}
printf("band-limit support for x= \n");
scanf("%d",&psfsize3);
cominputptr = cominput;
comoutputptr = comoutput;
y_sum = 0;
for(i=0;1<z_size;i++){
    for (y=0;y<y_size;++y){
        for (x=0;x<x_size,++x,++cominputptr,++comoutputptr)
        {
            if((y<y_size/2)&&(x==0)&&(i==0))
                printf("%d
%f\n",y,hypot(comoutputptr->real,comoutputptr->imag));
        }
    }
}
printf("band-limit support for y= \n");
scanf("%d",&psfsize4);
cominputptr = cominput;
comoutputptr = comoutput;
z_sum = 0;
for(i=0;i<z_size;i++){
    for (y=0;y<y_size;++y){
        for (x=0;x<x_size;++x,++cominputptr,++comoutputptr)
        {
            if((i<z_size/2)&&(x==0)&&(y==0))
                printf("%d
%f\n",i,hypot(comoutputptr->real,comoutputptr->imag));
        }
    }
}
printf("band-limit support for z= \n");
scanf("%d",&psfsize5);
/**********************************************************/
deconv( );
/**********************/
}
/****************** End of Main ******************/
/**********************************************************/
read_image(char *buf, int i)
/**********************************************************/
{
    unsigned char *ifile1,low_byte,hi_byte;
    unsigned char *ifile1ptr;
    int col_len,row_len;
    int fdi,x,y;
    fdi = open(buf,0);
    if (fdi<0){
        printf("error in opening the file\n");
        exit(1);
    }
    asize1=x_size;
    asize2=y_size;
    ifile1=(unsigned char *)malloc(asize1*asize2*sizeof
        (unsigned char));
    read(fdi,ifile1,asize1*asize2*sizeof(unsigned char));
    ifile1ptr=ifile1;
    if(invert==1){
        for(y=0;y<asize2;y++){
            for(x=0;x<asize1;x++,ifile1ptr++){
                if((y>=orig_cord.y_orig1)&&
                    (y< orig_cord.y_orig2)&&
                    (x>=orig_cord.x_orig1)&&
                    (x< orig_cord.x_orig2)){
                    *input1ptr = 255-(float)*ifile1ptr;
                    if( maxout2< *input1ptr)maxout2= *input1ptr ;
                    if( minout2> *input1ptr)minout2= *input1ptr ;
                    input1ptr++;
                }
            }
        }
    }
    else{
        for(y=0;y<asize2;y++){
            for(x=0;x<asize1;x++,ifile1ptr++){
                if((y>=orig_cord.y_orig1)&&
                    (y< orig_cord.y_orig2)&&
                    (x>=orig_cord.x_orig1)&&
                    (x< orig_cord.x_orig2)){
                    *input1ptr = (float)*ifile1ptr;
                    if( maxout2< *input1ptr)maxout2= *input1ptr ;
                    if( minout2> *input1ptr)minout2= *input1ptr ;
                    input1ptr++;
                }
            }
        }
    }
    free(ifile1);
    close(fdi);
}
/**********************************************************/
write_image(char *buf1, int i, int spec)
/**********************************************************/
{
    register int fd,x,y,asize;
    unsigned char *buf,*bufptr;
    float *ipixptr,pix_int;
    asize = (asize1>asize2) ? asize1: asize2;
    buf=(insigned char *)malloc(asize*asize*sizeof
        (unsigned char));
    fd=creat(buf1,0755);
    if(fd<0){
        printf("error in creating the file\n");
        exit(1);
    }
    bufptr=buf;
    comoutputptr=comoutput+i*xy_size;
```

```
            if(spec==1){
               for (y=0;y<asize;y++){
                  for (x=0;x<asize;x++,bufptr++,comoutputptr++){
                     if(maxout2 == 0){
                        *bufptr = 0;
                        continue;
                     }
                     /* to truncate the edges */
                     else
   if((x>=x_size-(psfsize2))|| (y>=y_size-(psfsize2))||
                  (x<32 psfsize2)|| (y<=psfsize2)||
                  (i>=z_size-(asize5))|| (i<=asize5))
                     *butptr = 0;
                  else if((x<x_ext)&&(y<y_ext)){
                     if((pix_int=
   (comoutputptr->real*255./maxout2))>255.){
                        pix_int = 255.;
                     }
                     *bufptr=(unsigned char)pix_int;
                     if(invert==1)    *bufptr=(unsigned char)255-
   *bufptr;
                  }
                  else {
                     *bufptr=0;
                  }
               }
            }
         }
         else {
            for (y=0;y<y_size;y++){
               for (x=0;x<x_size;x++,bufptr++,comoutputptr++){
                  if(maxout2 == 0){
                     *bufptr = 0;
                     continue;
                  }
                  /* to truncate the edges */
                  else
   if((x>=x_size-(psfsize2))|| (y>=y_size-(psfsize2))||
                  (x<=psfsize2)|| (y<=psfsize2)||
                  (i>=z_size-(asize5))|| (i<32 asize5))
                     *bufptr = 0;
                  else if((x<x_ext)&&(y<y_ext)){
                     *bufptr=(unsigned
   char) ((float) (comoutputptr->real-minout2)*255./
                           (maxout2-minout2));
                     if(invert==1) *bufptr = 255- bufptr;
                  }
                  else {
                     *butptr=0;
                  }
               }
            }
         }
         write(fd,buf,asize*asize*sizeof(unsigned char));
         free(buf);
         close(fd);
      }
   /*******************************************************/
   write_psf(char *buf1, int i)
   /*******************************************************/
   {
      register int fd,x,y;
      unsigned char *buf,*bufptr;
      buf=(unsigned char *)malloc(psfsize*psfsize*sizeof
               (unsigned char));
      fd=creat(buf1,0755);
      if(fd<0){
         printf("error in creating the file\n");
         exit(1);
      }
      bufptr=buf;
      for (y=0;y<psfsize;y++){
         for (x=0;x<psfsize;x++,bufptr++){
            if(maxout2 == 0){
               *bufptr = 0;
               continue;
            }
            *bufptr=(unsigned
   char) ((float) (psf[x][y][i]-minout2)*255./
                  (maxout2-minout2));
            if(invert==1) *bufptr = 255- *bufptr;
         }
      }
      write(fd,buf,psfsize*psfsize*sizeof(unsigned char));
      free(buf);
      close(fd);
   }
   /*******************************************************/
   deconv(void)
   {
      int x,y,i,j,count,count1;
      float lambda1;
      float psf_energy;
      float mag2psf;
      if(k==0){
         lambda = 1000.;
         printf("lambda = %f\n",lambda);
         printf("required lambda = \n");
         scanf("%f",&lambda);
      }
      compsfptr = compsf;
      cominputptr = cominput;
      compoutputptr = comoutput;
      for(i=0;i<z_size;i++){
         for (y=0;y<y_size;++y){
   for(x=0;x<x_size;x++,compsfptr++,cominputptr++,comoutputptr
   ++)
            {
               mag2psf = compsfptr->real*compsfptr->real+
                        compsfptr->imag*compsfptr->imag;
               comoutputptr->real =
   (comoutputptr->real+lambda*((compsfptr->real *
   cominputptr->real) +
                        (compsfptr->imag * cominputptr->imag)))/
                              (1+ lambda* mag2psf);
               comoutputptr->imag =
   (comoutputptr->imag+lambda*((compsfptr->real *
   cominputptr->imag)-
                        (compsfptr->imag * cominputptr->real)))/
                              (1+ lambda * mag2psf);
            }
         }
      }
      cfft3d(1,x_size,y_size,z_size,comoutput,x_size,y_size,works
   pace);
      comoutputptr = comoutput;
      for (i=0;i<z_size;i++){
         for (y=0;y<y_size;y++){
            for (x=0;x<x_size;x++,comoutputptr++){
               comoutputptr->real /= (float)datasize;
               comoutputptr->imag /= (float)datasize;
            }
         }
      }
      comoutputptr=comoutput;
      for(i=0;i<z_size;i++){
         for (y=0;y<y_size;y++){
            for(x=0;x<x_size;x++,comoutputptr++){
               if((x>=x_edge)|| (y>=y_edge)|| (y<asize4)|| (x<asize4))
               {
                  if((x>=x_edge)&&(y>=asize4)&&(y<y_edge))
                     comoutputptr->real =
   (comoutputptr-(x-x_edge+1))->real+
                        (-(comoutputptr-(x-x_edge+1))->real+
                        (comoutputptr-(x-asize4))->real)*
                           (x-x_edge+)/(float)asize3;
                  else if ((x<asize4)&&(y>=asize4)&&(y<y_edge))
                     comoutputptr->real =
   (comoutputptr-(x-x_edge+1))->real+
                        (- (comoutputptr-(x-x_edge+1))->real+
                        (comoutputptr-(x-asize4))->real)*
                           (asize4+x)/(float)asize3;
                  else if((y>=y_edge)&&(x>=asize4)&&(x<x_edge))
                     comoutputptr->real =
   (comoutputptr-(y-y_edge+1)*x_size)->real+
                        (-(comoutputptr-(y-y_edge+1)*x_size)->real+
                        (comoutputptr-(y-asize4)*x_size)->real)*
                           (y-y_edge+1)/(float)asize3;
                  else if ((y<asize4)&&(x>=asize4)&&(x<x_edge))
                     comoutputptr->real =
   (comoutputptr-(y-y_edge+1)*x_size)->real +
                        ((comoutputptr-(y-asize4)*x_size)->real -
                        (comoutputptr-(y-y_edge+1)*x_size)->real)*
                           (asize4+y)/(float)asize3;
```

```
            else if ((x<asize4)&&(y<asize4))comoutputptr->real
=
                (comoutputptr-(x-asize4)-(y-asize4)*x_size)->real *
                    gauss_fact[asize4-x]*
                    gauss_fact[asize4-y];
                else if ((x>=x_edge)&&(y>=y_edge))comoutput->real
=
                    (comoutputptr-(x-x_edge+1)-(y-y_edge+1)->real *
                        gauss_fact[asize4-x_size+x]*
                        gauss_fact[asize4-y_size+y];
                else if ((x>=x_edge)&&(y<asize4))
comoutputptr->real=
                    (comoutputptr-(x-x_edge+1)-(y-asize4))->real*
                        gauss_fact[asize4-x_size+x]*
                        gauss_fact[asize4-y];
                else if
((x<asize4)&&(y>=y_size-asize4))comoutputptr->real =
                    (comoutputptr-(x-asize4)-(y-y_edge+1))->real *
                        gauss_fact[asize4-x]*
                        gauss_fact[asize4-y_size+y];
            }
        }
    }
}
    comoutputptr=comoutput;
    for(i=0;i<z_size;i++){
        for(y=0;y<y_size;y++){
            for (x=0;x<x_size;x++,comoutputptr++){
                if(i>=z_edge){
            comoutputptr->real =
(comoutputptr-(i-z_edge+1)*xy_size)->real+
                ((comoutputptr-(i-asize5)*xy_size)->real -
                    (comoutputptr-(i-z_edge+1)*xy_size)->real)*
                    (i-z_edge+1)/((float)asize6);
            }
            else if(i<asize5){
            comoutputptr->real =
(comoutputptr-(i-z_edge+1)*xy_size)->real +
                ((comoutputptr-(i-asize5)*xy_size)->real -
                    (comoutputptr-(i-z_edge+1)*xy_size)->real)*
                    (i+asize5)/((float)asize6);
            }
        }
    }
}
    comoutputptr=comoutput;
    for(i=0;i<z_size;i++){
        for (y=0;y<y_size;y++){
            for(x=0;x<x_size;x++,comoutputptr++){
if((x>=x_size-asize4-1)|| (y>=y_size-asize4-1)|| (y<=asize4) |
| (x<=asize4))
{
    if(x==0)xm=x_size-1;else xm = x-1;
    if(y==0)ym=y_size-1;else ym = y-1;
    if(x==x_size-1)xp=0; else xp = x+1;
    if(y==y_size-1)yp=0; else yp = y+1;
    comoutputptr->imag = ((comoutputptr-(x-xm)->real +
        (comoutputptr-(x-xm)-(y-yp)*x_size)->real +
        (comoutputptr-(x-xm)-(y-ym)*x_size)->real+
        comoutputptr->real+(comoutputptr-(y-yp)
            *x_size)->real+
        (comoutputptr-(y-ym)*x_size)->real +
        (comoutputptr-(x-xp))->real+(comoutputptr-
            (x-xp)-(yp)*x_size)->real+
        (comoutputptr-(x-xp)-(y-ym)*x_size)->real)/9.;
}
            }
        }
    }
    comoutputptr = comoutput;
    for(i=0;i<z_size;i++){
        for (y=0;y<y_size;y++){
            for (x=0;x<x_size;x++,comoutputptr++)
            {
                if((x>=x_size-asize4-1)|| (y>=y_size-asize4-1)||
                    (y<=asize4)|| (x<=asize4))
{
    comoutputptr->real = comoutputptr->imag;
    if(comoutputptr->real < 0)comoutputptr->real = 0;
    comoutputptr->imag = 0;
}
            }
        }
    }
    comoutputptr=comoutput;
    for(i=0;1<z_size;i++){
        for (y=0;y<y_size;++y){
            for(x=0;x<x_size;x++,comoutputptr++){
                if(comoutputptr->real<0)comoutputptr->real = 0;
                comoutputptr->imag = 0;
                if(maxout2<comoutputptr->real) maxout2 =
comoutputptr->real;
            }
        }
    }
    printf("Interation=%d,maxout=%f\n",k,maxout2);
for(i=0;i<z_size;i++)
    write_image(output_name(i),i,2);
printf("max = %f, min = %f\n",maxout2,minout2);
if(k==final)exit(0);
/*****************************************************/
    cfft3d(-1,x_size,y_size,z_size,comoutput,x_size,y_size,
        workspace);
/*****************************************************/
    if(k>=10){
        goto skip_psf;
    }
    compsfptr = compsf;
    cominputptr = cominput;
    comoutputptr = comoutput;
    /* Compute the signal */
    psf_energy = 0;
    for(i=0;i<z_size;i++){
        for (y=0;y<y_size;++y){
for(x=0;x<x_size;x++,comoutputptr++,compsfptr++,cominputptr
++)
            {
            mag2psf = comoutputptr->real*comoutputptr->real+
                comoutputptr->imag*comoutputptr->imag;
            if(((x<=psfsize3)&&(y<=psfsize4)&&(i<=psfsize5))||
                ((x>=x_size-psfsize3)&&(y<=psfsize4)&&
                    (i<=psfsize5))||
                ((x<=psfsize3)&&(y>=y_size-psfsize4)&&
                    (i<=psfsize5))||
                ((x>=x_size-psfsize3)&&(y>=y_size-psfsize4)&&
                    (i<=psfsize5))||
                ((x<=psfsize3)&&(y<=psfsize4)&&(i>=z_
                    size-psfsize5))||
                ((x>=x_size-psfsize3)&&(y<=psfsize4)&&(i>=z_
                    size-psfsize5))||
                ((x<=psfsize3)&&(y>=size-psfsize4)&&(i>=z_
                    size-psfsize5))||
                ((x>=x_size-psfsize3)&&(y>=y_size-psfsize4)&&
                    (i>=z_size-psfsize5)))
{
    compsfptr->real = (compsfptr->real+labmda
*((comoutputptr->
        real * cominputptr->real) + comoutputptr->imag *
            cominputptr->imag)))/
                        (1.+ lambda * (mag2psf));
    compsfptr->imag = (compsfptr->imag+lambda *((comoutputptr
        ->real * cominputptr->imag)- (comoutputptr->imag *
            cominputptr->real)))/
                        (1.+ lambda * (mag2psf));
}
            else {
                psf_energy +=
compsfptr->real*compsfptr->real+compsfptr->imag*compsfptr->
imag;;
                compsfptr->real = compsfptr->imag = 0;}
            }
        }
    }
    printf("psf energy outside =%f\n",psf_energy);
/*****************************************************/
    cfft3d(1,x_size,y_size,z_size,compsf,x_size,y_size,workspac
e);
    compsfptr = compsf;
    for (i=0;1<z_size;i++){
        for (y=0;y<y_size;y++){
            for (x=0;x<x_size;x++,compsfptr++){
                compsfptr->real /= (float)datasize;
                compsfptr->imag /= (float)datasize;
            }
```

```
        }
    }
    psf_sum = 0;
    compsfptr=compsf;
    for(i=0;i<z_size;i++){
        for(y=0;y<y_size;y++){
            for(x=0;x<x_size;x++,compsfptr++)
            {
                if(((x<=psfsize2)&&(y<=psfsize2)&&(l<=psfsize))||
                    ((x>=x_size-psfsize2)&&(y<=psfsize2)&&(i<
                        =psfsizez))||
                    ((x<=psfsize2)&&(y>=y_size-psfsize2)&&(i<
                        =psfsizez))||
                    ((x>=x_size-psfsize2)&&(y>=y_size-psfsize2)&&(i<
                        =psfsizez))||
                    ((x<=psfsize2)&&(y<=psfsize2)&&(i>=z_size
                        -psfsizez))||
                    ((x>=x_size-psfsize2)&&(y<=psfsize2)&&(i>=z_size
                        -psfsizez))||
                    ((x<=psfsize2)&&(y>=y_size2)&&(i>=z_size
                        -psfsizez))||
                    ((x>=x_size-psfsize2)&&(y>=y_size-psfsize2)&&(i>=z
                        _size-psfsizez)))
{
    if(compsfptr->real<0)compsfptr->real = 0;
    compsfptr->imag = 0;
}
                else{
                    compsfptr->imag = 0;compsfptr->real = 0;}
            }
        }
    }
    compsfptr=compsf;
    for(i=0;i<z_size;i++){
        for(y=0;y<y_size;y++){
            for(x=0;x<x_size;x++,compsfptr++)
            {
                psf_sum += compsfptr->real;
            }
        }
    }
    printf("psfsum = %f\n",psf_sum*sf);
    compsfptr=compsf;
    for(i=0;i<z_size;i++){
        for(y=0;y<y_size;y++){
            for(x=0;x<x_size;x++,compsfptr++)
            {
                compsfptr->real /= (psf_sum*sf);
                compsfptr->imag = 0;
            }
        }
    }
    /* As defined earlier, for the following loop, asize5
        = psfsizez/2 */
    compsfptr = compsf;
    for(i=0;i<z_size;i++){
        for (y=0;y<y_size;++y){
            for (x=0;x<x_size;++x,++compsfptr)
            {
                if(((x<=psfsize2)&&(y<=psfsize2)&&(i<=asize5))||
                    ((x>=x_size-psfsize2)&&(y<=psfsize2)&&(i<=asize5))||
                    ((x<=psfsize2)&&(y>=y_size-psfsize2)&&(i<=asize5))||
                    ((x>=x_size-psfsize2)&&(y>=y_size-psfsize2)&&
                        (i<=asize5))||
                    ((x<=psfsize2)&&(y<=psfsize2)&&(i>=z_size-asize5))||
                    ((x>=x_size-psfsize2)&&(y<=psfsize2)&&(i>=z
                        _size-asize5))||
                    ((x<=psfsize2)&&(y>=y_size-psfsize2)&&(i>=z_size
                        -asize5))||
                    ((x>=x_size-psfsize2)&&(y>=y_size-psfsize2)&&
                        (i>=z_size-asize5))
psf[(x+psfsize2)%x_size][(y+psfsize2)%y_size][(i+asize5)%z_
size]= compsfptr->real;
            }
        }
    }
    for(i=0;i<psfsizez;i++)
        write_psf(psf_name(i),i);
    cfft3d(-1,x_size,y_size,z_size,compsf,x_size,y_size,workspa
ce);
    /*********************************************************/
    skip_psf;
```

```
    if(k<=final) {
        k+=1;
        deconv( );
    }
}
```

It is understood that the invention is not confined to the particular embodiments set forth herein as illustrative, but embraces all such forms thereof as come within the scope of the following claims.

What is claimed is:

1. A method of reconstructing an output signal g from an acquisition system instrument to estimate an ideal input signal f to the acquisition system instrument, comprising the steps of:

(a) using the acquisition system instrument to acquire a signal g which is dependent on a variable of one or more dimensions, wherein the output signal g comprises an actual or ideal input signal f to the acquisition system instrument convolved with an instrument response function h of the acquisition system instrument and with noise, and storing the signal g in digital form in a memory of a signal processor;

(b) determining using the signal processor the Fourier transform G of the output signal g, and selecting frequency bandlimits in each dimension based on the range of signal frequency content exhibited by the Fourier transform G in each dimension;

(c) selecting an initial response function $h_o$ for the acquisition system instrument, and determining the Fourier transform of the initial response function $h_o$ and applying in the signal processor the selected frequency bandlimits to the Fourier transform of $h_o$ to provide an initial frequency domain estimate $H_o$;

(d) then iteratively determining in the signal processor estimates of the ideal input signal f and of the acquisition system instrument response function h, where the number of the last iteration is n, comprising at the kth iteration the steps of:

(1) determining an estimator $\overline{F}_k$ in the frequency domain as $$\overline{F}_k = F_k + \frac{\lambda H_k^*(G - H_k F_k)}{1 + \lambda H_k^* H_k}$$

for k=0, 1, . . . . , n
$F_o = G$,
$H_o$ is determined as set forth above,
$F_1$ and $H_k$ are Fourier transforms of estimates of the ideal input signal f and of the acquisition system instrument response function h, respectively, as determined during the k-1 iteration;
$H_k^*$ is the complex conjugate of $H_k$;
$\lambda$ is a selected parameter determined based on the noise variance of the output signal g, (2) determining an estimate $f_{k+1}$ for the ideal input signal as the inverse Fourier transform of $\overline{F}_k$ for all values thereof which are real and positive within a selected spatial extent and as zero otherwise;

(3) determining the Fourier transform $F_{k+1}$ of $f_{+1}$;

(4) determining an estimator $\overline{H}_k$ as $$\overline{H}_k = H_k + \frac{\lambda F_{k+1}^*(G - H_k F_{k+1})}{1 + \lambda F_{k+1}^* F_{k+1}}$$

where $F^*_{k+1}$ is the complex conjugate of $F_{k+1}$;

(5) applying the selected frequency bandlimits to $H_k$;

(6) determining an estimate $h_{k+1}$ of the acquisition system instrument response function as the inverse Fourier transform of the selected frequency bandlimited $H_k$ for all values thereof which are real and positive within a selected spatial extent and as zero otherwise and normalized to a selected value;

(7) repeating the steps (1)–(6) until a selected criterion is met and providing the final estimate fn as an output signal which is an estimate of the ideal input signal f.

2. The method of claim 1 Wherein the initial response function he of the acquisition system instrument is the Dirac delta function.

3. The method of claim 1 wherein the parameter $\lambda$ is selected based on the noise variance of the signal g, with lower values of $\lambda$ selected where high noise variance is present and higher values of $\lambda$ selected where lower noise variance is present.

4. The method of claim 1 wherein the parameter $\lambda$ is selected to have a value in the range of 100 to 20,000.

5. The method of claim 1 wherein the parameter $\lambda$ is selected to have a value of approximately 1,000.

6. The method of claim 1 wherein the output signal g of the acquisition system instrument is a function of a variable which is at least two dimensional, and further including the steps of storing data corresponding to the signal data g in a memory of the signal processor, subdividing the signal data g into a plurality of sets of signal data, the signal data composing each set partially overlapping the signal data for each adjacent set, and carrying out the method of claim 1 on each signal data set to determine a response function $\hat{h}$ and estimated signal function $\hat{f}$ for each signal data set.

7. The method of claim 6 wherein the variable of which the output signal g is a function is three dimensional.

8. The method of claim 1 wherein the acquisition system instrument is a confocal microscope system and wherein the output signal g comprises digital data corresponding to light intensity values in a three dimensional array corresponding to light received from a three dimensional sample examined by the confocal microscope system.

9. The method of claim 8 including the further step of displaying on a video screen to an operator a visual image of the estimate of the ideal input signal f for data points corresponding to a single layer in a three dimensional array of signal data obtained from the sample by the confocal microscope system.

10. The method of claim 1 wherein in the step of determining the estimated response function $h_{k+1}$, the estimated response function is normalized so as to have a sum of values equal to one.

11. The method of claim 1 wherein the selected criterion is that a selected number of iterations is completed which is less than or equal to 10.

12. A method of reconstructing an output signal g obtained from an acquisition system instrument to estimate an ideal input signal f to the acquisition system instrument, comprising the steps of:

(a) using the acquisition system instrument to acquire an output signal g which is dependent on a variable of one or more dimensions, wherein the output signal g comprises an actual or ideal signal f to the acquisition system instrument convolved with an instrument response function h of the acquisition system instrument and with noise;

(b) providing the signal g from the acquisition system instrument to a signal processor and storing the signal g in digital form in the memory of the signal processor;

(c) estimating for the signal g in digital form a selected bandlimit of the significant frequencies in the signal g in digital form and providing that estimate to the signal processor;

(d) beginning in the signal processor an iterative procedure by (1) estimating in the frequency domain the ideal input signal f using a selected initial estimate of the response function h of the acquisition system instrument which is transformed to the frequency domain and the signal g in digital form transformed to the frequency domain, (2) transforming the frequency domain estimate to the spatial domain and applying constraints in the spatial domain to the estimate of the ideal input signal f to constrain the estimate of the ideal input signal f to be real and positive within a selected spatial extent and otherwise zero, (3) using the transform to the frequency domain of the constrained spatial domain estimate of the ideal input signal f, the transform to the frequency domain of the signal g in digital form and an estimate of the response function h in the frequency domain to obtain a new estimate of the response function h in the frequency domain which is constrained in the frequency domain to be within the selected bandlimit, (4) transforming the constrained frequency domain estimate of the response function h to the spatial domain and constraining the estimate of h to be real and positive within a selected spatial extent and normalized to a selected value to provide an updated estimate of h, then, (5) using the updated estimate of h repeating the iterative procedure until a selected criterion is met to provide a final estimate f as an output signal which is an estimate of f.

13. The method of claim 12 including the step of displaying the estimated signal $\hat{f}$ as an image on a display screen.

14. The method of claim 12 including, after the step of storing the signal g in digital form, the step of segmenting the signal g in digital form into overlapping segments in the spatial domain, and wherein the step of estimating comprises estimating for each segment of signal g a selected bandlimit of the significant frequencies in the signal g, and including the additional steps of proceeding to the next segment and repeating the steps of the iterative procedure in the signal processor for each segment until estimated values $\bar{f}$ of the ideal input signal f and $\bar{h}$ of the response function h are obtained for each segment, then recombining the estimates $\bar{f}$ for each segment to provide a combined estimated signal.

15. The method of claim 14 including the additional step of displaying the combined estimated signal as an image on a display screen.

16. The method of claim 12 wherein the initial estimate of the impulse response function h of the image acquisition system is a unit Dirac delta impulse function.

17. The method of claim 12 wherein the instrument is a confocal scanning microscope and wherein the step of using the instrument to acquire a signal comprises scanning a specimen at a plurality of image planes at which the microscope is focused to develop a three dimensional array of image signal data in the spatial domain.

18. The method of claim 12 wherein the step of using the constrained estimate of h to obtain an estimate of f is carried out in accordance with the following steps at the kth iteration where $H_k$ and $F_k$ are the initial values or are determined at the k-1 iteration of n iterations:

determining an estimator $F_k$ in the frequency domain as
for k=0, 1, ..., n
$F_o = G$,
$H_o$ is the Fourier transform of a selected initial response function with selected bandlimits applied thereto;
$H_k^*$ is the complex conjugate of $H_k$; $\lambda$ is a selected parameter determined based on the noise variance of the output signal g, and determining an estimate $f_{k+1}$ for the actual input signal f as the inverse Fourier transform of $\bar{F}_y$ for all values thereof which are real and positive within a selected spatial extent and as zero otherwise.

19. The method of claim 18 wherein the step of using the constrained estimate of f to obtain an estimate of h is carried out in accordance with the following steps wherein $f_{k+1}$ is the estimate of f:

determining the Fourier transform $F_{k+1}$ of $f_{k+1}$;
determining an estimator $H_k$ as
where $F_{k+1}$ is the complex conjugate of $F_{k+1}$;
applying the selected frequency bandlimits to $H_k$; and
determining an estimate $h_{k+1}$ of the acquisition system instrument response function as the inverse Fourier transform of the bandlimited $H_k$ for all values thereof which are real and positive within a selected spatial extent and as zero otherwise and normalized to a selected value.

20. The method of claim 19 wherein the parameter $\lambda$ is selected based on the noise variance of the signal g, with lower values of $\lambda$ selected where high noise variance is present and higher values of $\lambda$ selected where lower noise variance is present.

21. The method of claim 19 wherein the parameter $\lambda$ is selected to have a value in the range of 100 to 20,000.

22. The method of claim 19 wherein the parameter $\lambda$ is selected to have a value of approximately 1,000.

23. The method of claim 12 wherein the variable of which the output signal g is a function is three dimensional.

24. The method of claim 23 wherein the instrument is a confocal microscope system and wherein the output signal g comprises digital data corresponding to light intensity values in a three dimensional array corresponding to light received from a three dimensional sample examined by the confocal microscope system.

25. An improved signal acquisition system comprising:

(a) an instrument which provides an output signal g which is dependent on a variable of one or more dimensions, wherein the output signal g is an actual or ideal input signal f to the acquisition system instrument convolved with an instrument response function h of the acquisition system instrument and noise;

(b) a signal processor with a memory receiving the signal g in digital data form;

(c) means in the signal processor for determining the transform G in the frequency domain of the output signal g;

(d) means in the signal processor for receiving and storing in the memory selected frequency bandlimits in each dimension which are based on the range of signal frequency content exhibited by G in each dimension, and for receiving and storing an initial frequency domain estimate $H_o$ for the instrument having the selected bandlimits applied thereto;

(e) means in the signal processor for iteratively determining estimates of the ideal input signal f to the instrument and of the instrument response function h, wherein the number of the last iteration is n, including at the kth iteration:

means for determining an estimator $\bar{F}_k$ in the frequency domain as $$\bar{F}_k = F_k + DH_k^*(G - H_k F_k)$$

for k=0, 1, ..., n
$F_o = G$,
$H_o$ is determined as set forth above,
$F_k$ and $H_k$ are Fourier transforms of estimates of the ideal input signal f and of the acquisition system instrument response function h, respectively, as determined during the k−1 iteration,
$H_k^*$ is the complex conjugate of $H_k$;
D is a bounded linear operator;

means for determining an estimate $f_{k+1}$ for the actual input signal as the inverse transform to the spatial domain of $\bar{F}_k$ for all values thereof which are real and positive within a selected spatial extent and as zero otherwise;

means for determining the transform to the frequency domain $F_{k+1}$ of $f_{k+1}$;

means for determining an estimator $H_k$ as $$\bar{H}_k = H_k + DF_{k+1}^*(G - H_k F_{k+1})$$

where $F^*_{k+1}$ is the complex conjugate of $F_{k+1}$ and D is a bounded linear operator;

means for applying the selected frequency bandlimits to $H_k$;

means for determining an estimate $h_{k+1}$ of the acquisition system instrument response function h as the inverse transform of the selected frequency bandlimited $\bar{H}_k$ for all values thereof which are real and positive within a selected spatial extent and as zero otherwise and normalized to a selected value;

and wherein the means for iteratively determining continues to iterate until a selected criterion is met and for providing the final estimate as an output signal $\hat{f}$ which is an estimate of the ideal input signal f.

26. The improved signal acquisition system of claim 25 wherein $$DH_k^* = \frac{\lambda H_k^*}{1 + \lambda H_k^* H_k}$$

where $\lambda$ is a selected parameter determined based on the noise variance of the output signal g, and $$DF_{k+1}^* = \frac{\lambda F_{k+1}^*}{1 + \lambda F_{k+1}^* F_{k+1}}$$

27. The improved signal acquisition system of claim 26 Wherein the parameter $\lambda$ has a value in the range of 100 to 20,000.

28. The improved signal acquisition system of claim 25 wherein the initial estimate $H_o$ of the acquisition system instrument response function is the bandlimited frequency domain transform of the Dirac delta function.

29. The improved signal acquisition system of claim 25 wherein the parameter $\lambda$ is selected to have a value of approximately 1,000.

30. The improved signal acquisition system of claim 25 wherein the output signal g of the instrument is a function of a variable which is at least two dimensional, wherein the signal processor further includes means for storing data corresponding to the signal g, for subdividing the data corresponding to the signal g into a plurality of sets of signal data, the signal data composing each set partially overlapping the signal data for each adjacent set, and for iteratively determining estimates of the ideal input signal f for each signal data set to determine a response function $\bar{h}$ and estimated signal $\hat{f}$ for each signal data set, and for combining the estimated signal $\hat{f}$ for each signal data set and providing the combined estimated signals as the output signal which is an improved estimate of the ideal input signal f.

31. The improved signal acquisition system of claim 25 wherein the variable of which the output signal g is a function is three dimensional.

32. The improved signal acquisition system of claim 25 wherein the acquisition system instrument is a confocal microscope and wherein the output signal g comprises digital data corresponding to light intensity values in a three dimensional array corresponding to light received from a three dimensional sample examined by the confocal microscope.

33. The improved signal acquisition system of claim 32 including a video screen and means for displaying on the video screen to an operator a visual image of the output signal $\hat{f}$ for data points corresponding to a single layer in a three dimensional array of data from the sample.

34. The improved signal acquisition system of claim 25 wherein the response function $h_{k+1}$ is normalized to have a sum of values equal to one.

35. The improved signal acquisition system of claim 25 wherein the selected criterion is that a selected number of iterations is completed which is less than or equal to 10.

36. The improved acquisition system of claim 25 wherein the transforms to the frequency domain are Fourier transforms and the transforms to the spatial domain are inverse Fourier transforms.

37. An improved confocal microscope system, comprising:

(a) an optical microscope having optics for examining a specimen, (b) a laser scanning confocal microscope system coupled to the optical microscope to obtain optical image information therefrom and providing an output signal g representative of the optical image information, wherein the output signal g is an actual or ideal input signal f to the confocal microscope system convolved with a response function h of the confocal microscope system and noise, (c) a signal processor with a memory connected to receive the output signal g from the laser scanning confocal microscope system and to provide an output signal representing an optical image, (d) a display device connected to the signal processor to receive the output signal to display the optical image corresponding to the output signal from the signal processor, (e) means in the signal processor for determining the transform G in the frequency domain of the output signal g;

(f) means in the signal processor for receiving and storing in the memory selected frequency bandlimits in each dimension which are based on the range of signal frequency content exhibited by the transform G in each dimension, and for receiving and storing an initial frequency domain estimate $H_o$ for the confocal microscope system having the selected frequency bandlimits applied thereto;

(g) means in the signal processor for iteratively determining estimates of the ideal input signal f to the confocal microscope system and of the confocal microscope system response function h, wherein the number of the last iteration is n, including at the kth iteration:

means for determining an estimator $F_k$ in the frequency domain as $$F_{k=}F_k+DH_k^*(G-H_kF_k)$$

for k=0, 1, . . . . , n
$F_o=G$,
$H_o$ is determined as set forth above,
$F_k$ and $H_k$ are Fourier transforms of estimates of the ideal input signal f and of the confocal microscope system response function h, respectively, as determined during the k−1 iteration,
$H_k^*$ is the complex conjugate of $H_k$;
D is a bounded linear operator;

means for determining an estimate $f_{k+1}$ for the actual input signal as the inverse transform to the spatial domain of $F_k$ for all values thereof which are real and positive within a selected spatial extent and as zero otherwise;

means for determining the transform to the frequency domain $F_{k+1}$ of $f_{k+1}$;

means for determining an estimator $\bar{H}_k$ as $$\bar{H}_k=H_k+DF^*_{k+1}(G-H_kF_{k+1})$$

where $F^*_{k+1}$ is the complex conjugate of $F_{k+1}$ and D is a bounded linear operator;

means for applying the selected frequency bandlimits to $\bar{H}_k$;

means for determining an estimate $h_{k+1}$ of the confocal microscope response function h as the inverse transform of the selected frequency bandlimited $\bar{H}_k$ for all values thereof which are real and positive within a selected spatial extent and as zero otherwise and normalized to a selected value;

and wherein the means for iteratively determining continues to iterate until a selected criterion is met and for providing the final estimate $f_n$ as the output signal to the display.

38. The confocal microscope system of claim 37 wherein $$DH_k^* = \frac{\lambda H_k^*}{1+\lambda H_k^* H_k}$$

where $\lambda$ is a selected parameter determined based on the noise variance of the output signal g, and $$DF_{k+1}^* = \frac{\lambda F_{k+1}^*}{1+\lambda F_{k+1}^* F_{k+1}} .$$

39. The confocal microscope system of claim 38 wherein the parameter $\lambda$ has a value in the range of 100 to 20,000.

40. The confocal microscope system of claim 38 wherein the parameter $\lambda$ is selected to have a value of approximately 1,000.

41. The confocal microscope system of claim 37 wherein the initial estimate Ho of the confocal microscope response function is the bandlimited frequency domain transform of the Dirac delta function.

42. The confocal microscope system of claim 37 wherein the output signal g is a function of a variable which is at least two dimensional, wherein the signal processor further includes means for storing data corresponding to the signal g, for subdividing the data corresponding to the signal g into a plurality of sets of signal data, the signal data composing each set partially overlapping the signal data for each adjacent set, and for iteratively determining estimates of the ideal input signal f for each signal data set to determine a response function $\hat{h}$ and estimated signal function $\hat{f}$ for each signal data set, and for combining the estimated signal $\hat{f}$ for each signal data set and providing the combined estimated signals as the output signal which is an improved estimate of the ideal input signal f to the display device.

43. The confocal microscope system of claim 37 wherein the variable of which the output signal g is a function is three dimensional.

44. The confocal microscope system of claim 37 wherein the display device includes a video screen, and displays on the video screen to an operator a visual image of the estimated input signal $\hat{f}$ for data points corresponding to a single layer in a three dimensional array of data from the specimen.

45. The confocal microscope system of claim 37 wherein the response function $h_{k+1}$ is normalized to have a sum of values equal to one.

46. The confocal microscope system of claim 37 wherein the selected criterion is that a selected number of iterations is completed which is less than or equal to 10.

47. The improved acquisition system of claim 37 wherein the transforms to the frequency domain are Fourier transforms and the transforms to the spatial domain are inverse Fourier transforms.

* * * * *

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

[Page 1 of 11]

It is certified that error appears in the above-indentified patent and that said Letters Patent is hereby corrected as shown below:

In column 1, after the title of the invention, insert the following paragraph --This application includes a listing of a computer program. A portion of the disclosure of this patent document contains material which is subject to copyright protection. The copyright owner has no objection to the facsimile reproduction by anyone of the patent document or the patent disclosure, as it appears in the Patent an Trademark Office patent file or records, but otherwise reserves all copyright rights whatsoever.-- as written in the application on page 1, lines 4-11.

In column 2, line 41 of the patent, "(PSF) o A" should be --(PSF). A--

In column 2, line 66 of the patent, "PSF In" should be --PSF. In--

In column 6, line 47 of the patent, "g=hz,900 f+n," should be --g=h⊗f+n,--

In column 6, line 48 of the patent, "wherez,900" should be --where ⊗--

In column 7, line 67 of the patent, "data g 13 as" should be --data g as--

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

[Page 2 of 11]

It is certified that error appears in the above-indentified patent and that said Letters Patent is hereby corrected as shown below:

In column 8, line 2 of the patent, --is-- should be inserted after "signal g" and before "determined,"

In column 9, line 20 of the patent, "$F_{k2}=F_k+DH_k^*(G-H_kF_k)$" should be -- $\overline{F}_k=F_k+DH_k^*(G-H_kF_k)$ --

In column 9, line 44 of the patent, "$H_k$" should be -- $\overline{H}_k$ --

In column 9, line 46 of the patent, "$H_k=H_k+DF_{k+1}^*(G-H_kF_{k+1})$" should be -- $\overline{H}_k=H_k+DF_{k+1}^*(G-H_kF_{k+1})$ --

In column 9, line 56 of the patent, "$H_k$" should be -- $\overline{H}_k$ --

In column 9, line 64 of the patent, "$h_{+1}$" should be --$h_{k+1}$--

In column 10, line 31 of the patent, " $|g-(hz,900\overline{f})|^2 \leq \delta_v$ " should be -- $|g-(h \otimes \overline{f})|^2 \leq \delta_v$ --

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

[Page 3 of 11]

It is certified that error appears in the above-indentified patent and that said Letters Patent is hereby corrected as shown below:

In column 10, line 39 of the patent, "$F_k$" should be -- $\overline{F}_k$ --

In column 10, line 43 of the patent, "$f_{+1}$" should be -- $f_{k+1}$ --

In column 10, line 45 of the patent, "$f_{+1}$" should be -- $f_{k+1}$ --

In column 10, line 52 of the patent, "same X as" should be -- same $\lambda$ as --

In column 10, line 54 of the patent, "$H_k$" should be -- $\overline{H}_k$ --

In column 10, line 55 of the patent, "$H_k$" should be -- $\overline{H}_k$ --

In column 10, line 58 of the patent, "$h_{k+1}$," should be -- $H_{k+1}$, --

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

[Page 4 of 11]

It is certified that error appears in the above-indentified patent and that said Letters Patent is hereby corrected as shown below:

In column 11, line 8 of the patent, $--f_{k+1}--$ should be inserted after "completed," and before "constitutes".

22. In column 11, line 9 of the patent, $--\hat{h}.--$ should be inserted after "estimate"

23. In column 11, line 13 of the patent, "ZF" should be --If--

In column 11, line 31 of the patent, "$\hat{f}$" should be --$\hat{f}$--

In column 11, line 33 of the patent, "(N1-M1+i)x(N2-M2+1)." should be --(N1-M1+1)x(N2-M2+1).--

In column 12, line 6 of the patent, "for A set" should be --for $\lambda$ set--

In column 16, line 36 of the patent, "int asize2,asize1,maximum,minimum,k,final;" should be --int asize2,asize1,asize,maximum,minimum,k,final;--

UNITED STATES PATENT AND TRADEMARK OFFICE
CERTIFICATE OF CORRECTION

PATENT NO. : 5,561,611

DATED : October 1, 1996

INVENTOR(S) : Gopal B. Avinash

It is certified that error appears in the above-indentified patent and that said Letters Patent is hereby corrected as shown below:

In column 17, line 18 of the patent, "z_edge=z_size-psfsize5;" should be --z_edge=z_size-asize5;--

In column 17, line 47 of the patent, "for(i=0,x=1;i<asize4;i++,x++)" should be --for(i=0,x=1;i<=asize4;i++,x++)--

In column 18, line 2 of the patent, "gauss_fact[asize4-x[*gauss_fact[asize4-y];" should be --gauss_fact[asize4-x]*gauss_fact[asize4-y];--

In column 18, line 14 of the patent, "for(i=0;i<z_size;++){" should be --for(i=0;i<z_size;i++){--

In column 18, line 65 of the patent, "cfft3di*x_size,y_size,z_size, workspace);" should be --cfft3di(x_size,y_size,z_size, workspace);--

In column 19, line 3 of the patent, "for(i=0;1<z_size;i++){" should be --for(i=0;i<z_size;i++){--

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

[Page 6 of 11]

It is certified that error appears in the above-indentified patent and that said Letters Patent is hereby corrected as shown below:

In column 19, line 43 of the patent, "printf`"%d"` should be --printf("%d--

In column 19, line 51 of the patent, "for(i=0;1<z_size;i++){" should be --for(i=0;i<z_size;i++){--

In column 20, line 59 of the patent, "buf=(insigned char `*`)malloc(asize`*`asize`*`sizeof" should be --buf=(unsigned char `*`)malloc(asize`*`asize`*`sizeof--1.

In column 21, line 9 of the patent, "(x<32psfsize2)|| (y<=psfsize2)||" should be --(x<=psfsize2)|| (y<=psfsize2)||--

In column 21, line 32 of the patent, "(i>=z_size-(asize5))|| (i<32asize5))" should be --(i>=z_size-(asize5))|| (i<=asize5))--

In column 23, line 26 of the patent, "(comoutputptr-(i-z_edge+1)xy_size)->real)*" should be --(comoutputptr-(i-z_edge+1)*xy_size)->real)*--

UNITED STATES PATENT AND TRADEMARK OFFICE
CERTIFICATE OF CORRECTION

PATENT NO. : 5,561,611

DATED : October 1, 1996

INVENTOR(S) : Gopal B. Avinash

It is certified that error appears in the above-indentified patent and that said Letters Patent is hereby corrected as shown below:

In column 23, line 46 of the patent, "comoutputptr->imag = ((comoutputptr-(x-xm)->real +" should be --comoutputptr->imag = ((comoutputptr-(x-xm))->real +--

In column 24, line 39 of the patent, "((x<=psfsize3)&&(y>=size-psfsize4)&&(i>=z_" should be --((x<=psfsize3)&&(y>=y_size-psfsize4)&&(i>=z_--

In column 24, line 43 of the patent, "labmda" should be --lambda--

In column 24, line 62 of the patent, "for (i=0;1<z_size;i++){" should be --for (i=0;i<z_size;i++){--

In column 25, line 7 of the patent, "if(((x<=psfsize2)&&(y<=psfsize2)&&(1<=psfsize))||" should be --if(((x<=psfsize2)&&(y<=psfsize2)&&(i<=psfsizez))||--

In column 25, line 16 of the patent, "((x<=psfsize2)&&(y>=y_size2)&&(i>=z_size" should be --((x<=psfsize2)&&(y>=y_size-psfsize2)&&(i>=z_size--

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

It is certified that error appears in the above-indentified patent and that said Letters Patent is hereby corrected as shown below:

In column 26, line 49 of the patent, "$F_l$" should be --$F_k$--

In column 26, line 57 of the patent, "$F_k$" should be -- $\overline{F}_k$ --

In column 26, line 60 of the patent, "$f_{+1}$" should be --$f_{k+1}$--

In column 26, line 61 of the patent, "$H_k$" should be -- $\overline{H}_k$ --

In column 27, line 1 of the patent, "$H_k$" should be -- $\overline{H}_k$ --

In column 27, line 4 of the patent, "$H_k$" should be -- $\overline{H}_k$ --

In column 27, line 8 of the patent, "fn" should be --$f_n$--

In column 27, line 11 of the patent, "Wherein" should be --wherein--

In column 27, line 12 of the patent, "he" should be --$h_0$--

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

It is certified that error appears in the above-indentified patent and that said Letters Patent is hereby corrected as shown below:

In column 28, line 49 of the patent, "$\tilde{f}$" should be -- $\hat{f}$ --

In column 28, line 49 of the patent, "$\tilde{h}$" should be -- $\hat{h}$ --

In column 28, line 51 of the patent, "$\tilde{f}$" should be -- $\hat{f}$ --

In column 29, line 3 of the patent, "$F_k$" should be -- $\overline{F}_k$ --

In column 29, between lines 3 and 4 the following should be inserted -- $\overline{F}_k = F_k + \dfrac{\lambda H_k^*(G - H_k F_k)}{1 + \lambda H_k^* H_k}$ --

In column 29, line 12 of the patent, "$\overline{F}_y$" should be -- $\overline{F}_k$ --

In column 29, line 20 of the patent, "$H_k$" should be -- $\overline{H}_k$ --

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

[Page 10 of 11]

It is certified that error appears in the above-indentified patent and that said Letters Patent is hereby corrected as shown below:

In column 29, between lines 20 and 21, the following should be inserted -- $\overline{H}_k = H_k + \dfrac{\lambda F^*_{k+1}(G-H_k F_{k+1})}{1+\lambda F^*_{k+1} F_{k+1}}$ In column 29, line 21 of the patent, "$F_{k+1}$" should be --$F^*_{k+1}$--

In column 29, line 22 of the patent, "$H_k$" should be -- $\overline{H}_k$ --

In column 29, line 25 of the patent, "$H_k$" should be -- $\overline{H}_k$ --

In column 30, line 7 of the patent, " $F_k = F_k + DH^*_k(G-H_k F_k)$ " should be -- $\overline{F}_k = F_k + DH^*_k(G-H_k F_k)$ --

In column 30, line 23 of the patent, "$H_k$" should be -- $\overline{H}_k$ --

In column 30, line 30 of the patent, "$H_k$" should be -- $\overline{H}_k$ --

UNITED STATES PATENT AND TRADEMARK OFFICE
CERTIFICATE OF CORRECTION

PATENT NO. : 5,561,611
DATED : October 1, 1996
INVENTOR(S) : Gopal B. Avinash

It is certified that error appears in the above-indentified patent and that said Letters Patent is hereby corrected as shown below:

In column 30, line 55 of the patent, "Wherein" should be --wherein--

In column 31, line 6 of the patent, "$\hat{h}$" should be -- $\hat{h}$ --

In column 32, line 7 of the patent, "$F_k$" should be -- $\overline{F}_k$ --

In column 32, line 10 of the patent, "$F_k = F_k + DH_k^*(G - H_k F_k)$" should be -- $\overline{F}_k = F_k + DH_k^*(G - H_k F_k)$ --

In column 32, line 62 of the patent, "Ho" should be --$H_0$--

Signed and Sealed this

Eighteenth Day of November 1997

BRUCE LEHMAN

Attest:

Attesting Officer

Commissioner of Patents and Trademarks